United States Patent
Ramachandran et al.

(10) Patent No.: US 9,590,894 B2
(45) Date of Patent: Mar. 7, 2017

(54) ESTABLISHING LABEL SWITCHED PATHS HAVING REFRESH INTERVAL INDEPENDENT FAST REROUTE FACILITY PROTECTION

(71) Applicant: Juniper Networks, Inc., Sunnyvale, CA (US)

(72) Inventors: Chandrasekar Ramachandran, Bangalore (IN); Markus Jork, Andover, MA (US); Yakov Rekhter, New York, NY (US); Harish Sitaraman, Koramangala (IN)

(73) Assignee: Juniper Networks, Inc., Sunnyvale, CA (US)

( * ) Notice: Subject to any disclaimer, the term of this patent is extended or adjusted under 35 U.S.C. 154(b) by 95 days.

(21) Appl. No.: 14/585,664

(22) Filed: Dec. 30, 2014

(65) Prior Publication Data

US 2016/0119821 A1    Apr. 28, 2016

(30) Foreign Application Priority Data

Oct. 27, 2014 (IN) ............................ 5340/CHE/2014

(51) Int. Cl.
*H04W 28/26* (2009.01)
*H04L 12/723* (2013.01)
(Continued)

(52) U.S. Cl.
CPC .......... *H04L 45/28* (2013.01); *H04L 41/0654* (2013.01); *H04L 41/0668* (2013.01);
(Continued)

(58) Field of Classification Search
CPC . H04L 41/0654; H04L 45/026; H04L 47/724; H04L 47/72; H04L 45/50;
(Continued)

(56) References Cited

U.S. PATENT DOCUMENTS 7,580,359 B2    8/2009  Pirbhai
7,680,952 B1 *  3/2010  Pan ..................... H04L 41/0668
                                                         370/237
(Continued)

OTHER PUBLICATIONS

Berger et al., "RSVP Refresh Overhead Reduction Extensions," Network Working Group, RFC 2961, Apr. 2001, 34 pp.
(Continued)

*Primary Examiner* — Hoang-Chuong Vu
(74) *Attorney, Agent, or Firm* — Shumaker & Sieffert, P.A.

(57) ABSTRACT

In one example, techniques of this disclosure may enable a point of local repair (PLR) network device to signal availability of link protection or node protection to a merge point (MP) network device and enable a network device to actively determine whether or not it is a merge point router. Based on whether or not the network device determines it is a MP, the network device may selectively clean up LSP states when there is an upstream link or node failure. The RSVP-TE protocol may be extended to enable a network device to send a tear down message to a downstream router, which may enable the downstream router to conditionally delete locale LSP state information. In some instances, a PLR network device may directly send a tear down message to a MP network device even though the PLR network device may not have a working bypass LSP.

23 Claims, 14 Drawing Sheets

(51) Int. Cl.
*H04L 12/751* (2013.01)
*H04L 12/703* (2013.01)
*H04L 12/911* (2013.01)
*H04L 12/707* (2013.01)
*H04L 12/24* (2006.01)
*H04L 29/06* (2006.01)

(52) U.S. Cl.
CPC ............ *H04L 45/026* (2013.01); *H04L 45/22* (2013.01); *H04L 45/50* (2013.01); *H04L 45/507* (2013.01); *H04L 47/72* (2013.01); *H04L 47/728* (2013.01); *H04L 65/4069* (2013.01)

(58) Field of Classification Search
CPC ......... H04L 45/22; H04L 45/28; H04L 45/00; H04L 45/02; H04L 41/0668; H04L 47/728; H04L 47/122; H04L 41/0677; H04W 28/26
See application file for complete search history.

(56) References Cited

U.S. PATENT DOCUMENTS

| | | | |
|---|---|---|---|
| 7,720,061 B1 | 5/2010 | Krishnaswamy et al. | |
| 8,165,032 B1* | 4/2012 | Hanif | H04L 41/0659 370/242 |
| 8,339,959 B1 | 12/2012 | Moisand et al. | |
| 8,441,919 B2* | 5/2013 | Vasseur | H04L 12/66 370/216 |
| 9,246,838 B1* | 1/2016 | Shen | H04L 47/724 |
| 2007/0011284 A1* | 1/2007 | Le Roux | H04L 12/5695 709/223 |
| 2008/0019266 A1* | 1/2008 | Liu | H04L 12/5695 370/228 |
| 2008/0170493 A1* | 7/2008 | Vasseur | H04L 45/00 370/217 |
| 2008/0304494 A1 | 12/2008 | Yokoyama | |
| 2009/0292943 A1* | 11/2009 | Hanif | H04L 45/00 714/4.1 |
| 2013/0301402 A1 | 11/2013 | Ceccarelli et al. | |
| 2014/0092722 A1* | 4/2014 | Jain | H04L 45/22 370/217 |
| 2014/0280711 A1* | 9/2014 | Asati | H04L 67/10 709/217 |
| 2016/0036520 A1 | 2/2016 | Swinkels et al. | |

OTHER PUBLICATIONS

Rekhter et al., "Carrying Label Information in BGP-4," Network Working Group, RFC 3107, May 2001, 8 pp.
Awduche et al., "RSVP-TE: Extensions to RSVP for LSP Tunnels," Network Working Group, RFC 3209, Dec. 2001, 61 pp.
Pan et al., "Fast Reroute Extensions to RSVP-TE for LSP Tunnels," Network Working Group, RFC 4090, May 2005, 38 pp.
Ali et al., "Node-ID Based Resource Reservation Protocol (RSVP) Hello: A Clarification Statement," Network Working Group, RFC 4558, Jun. 2006, 7 pp.
De Oliveira et al., "Label Switched Path (LSP) Preemption Policies for MPLS Traffic Engineering," Network Working Group, RFC 4829, Apr. 2007, 19 pp.
Andersson et al., "LDP Specification," Network Working Group, RFC 5036, Oct. 2007, 135 pp.
Satyanarayana et al., "Extensions to GMPLS Resource Reservation Protocol (RSVP) Graceful Restart," Network Working Group, RFC 5063, Oct. 2007, 24 pp.
Meyer et al., "MPLS Traffic Engineering Soft Preemption," Internet Engineering Task Force (IETF), RFC 5712, Jan. 2010, 13 pp.
U.S. Appl. No. 14/585,683, by Chandrasekar Ramachandran et al., filed Dec. 30, 2014.
U.S. Appl. No. 14/585,722, by Chandrasekar Ramachandran et al., filed Dec. 30, 2014.
U.S. Appl. No. 14/585,745, by Chandrasekar Ramachandran et al., filed Dec. 30, 2014.
Notice of Allowance from U.S. Appl. No. 14/585,683, mailed Jul. 25, 2016, 9 pp.
Office Action from U.S. Appl. No. 14/585,722, dated Jul. 27, 2016, 17 pp.
Response filed Sep. 27, 2016 to the Office Action from U.S. Appl. No. 14/585,722, dated Jul. 27, 2016, 14 pp.
Notice of Allowance from U.S. Appl. No. 14/585,683, mailed Oct. 24, 2016, 10 pp.
Final Office Action from U.S. Appl. No. 14/585,722, dated Dec. 9, 2016, 12 pp.

* cited by examiner

ESTABLISHING LABEL SWITCHED PATHS HAVING REFRESH INTERVAL INDEPENDENT FAST REROUTE FACILITY PROTECTION

This application claims the benefit of India Patent Application No. 5340/CHE/2014, filed Oct. 27, 2014, the entire content of which is incorporated herein by reference.

TECHNICAL FIELD

The disclosure relates to packet-based computer networks and, more particularly, to forwarding packets within computer networks.

BACKGROUND

Routing devices within a network, often referred to as routers, maintain routing information that describes available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Open Shortest Path First (OSPF) or the Intermediate System to Intermediate System (ISIS).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System-Intermediate System (ISIS) protocol or the Open Shortest Path First (OSPF) protocol.

Head-end routers of an LSP are commonly known as ingress routers, while routers at the tail end of the LSP are commonly known as egress routers. Ingress and egress routers, as well as intermediate routers along the LSP that support MPLS, are referred to generally as label switching routers (LSRs). A set of packets to be forwarded along the LSP is referred to as a forwarding equivalence class (FEC). A plurality of FECs may exist for each LSP, although there may, in some examples, be only one active LSP for any given FEC. Typically, a FEC definition includes the IP address of the destination for the packets traversing the LSP, e.g., a destination IP address within headers of packets transported by the LSP. In general, each router along the LSP maintains FEC to Nexthop Label Forwarding Entry mapping that associates a FEC with an incoming label and an outgoing label. The ingress LSR, referred to as a label edge router (LER), uses label information, propagated upstream by each LSR along a path from the egress LER, to affix a label to each packet destined for the FEC, thereby admitting the packet to the LSP. More specifically, transport LSRs along the path use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table based on the lookup and forwards the packet to the appropriate downstream LSR or egress LER. The egress LER removes the label from the packet and forwards the packet to its destination in accordance with non-label based packet-forwarding techniques. If Penultimate Hop Popping (PHP) is enabled for the LSP, then the penultimate LSR removes the label from the packet before forwarding to Egress LER.

SUMMARY

In general, this disclosure describes techniques for scaling an MPLS protocol, such as RSVP-TE, in a manner that may be capable of establishing and maintaining a high volume of LSPs, such as multiple hundreds of thousands of LSPs. For example, in one example implementation a refresh interval of the MPLS protocol is extended such that the number of messages exchanged between nodes in the LSP is reduced. However, extending the refresh interval may result in a build up of stale state information among the network devices in an LSP. In order to extend the refresh interval while reducing the build up of stale state information on the nodes, this disclosure describes additional example implementations utilizing various modifications to the MPLS protocol.

For example, this disclosure describes example implementations that enable a point of local repair (PLR) router to signal availability of link protection or node protection to a merge point (MP) router and that enable a router to actively determine whether or not it is a merge point router. Based on whether or not the router determines it is a merge point router, the router may selectively clean up LSP states stored by the router when there is an upstream link or node failure.

As another example, techniques of this disclosure may provide a set of extensions to the MPLS protocol, such as RSVP-TE, that may enable a router to send a tear down message to a downstream router, which may enable the downstream router to conditionally delete locale state information for the LSP. In some instances, a PLR router may directly send a tear down message to a merge point router even though the PLR router may not have a working bypass LSP and/or may not have already refreshed backup LSP state information. According to the techniques of this disclosure, the RSVP-TE extensions may be backwards compatible with routers along the LSP that do not support these modifications to the RSVP-TE protocol.

In one example, a method includes receiving, with a first network device and from a second network device, a first resource reservation path message for establishing a label switched path between the second network device and a third network device by way of the first network device such that the first network device is positioned between the second network device and the third network device along the label switched path, wherein the first resource reservation request message specifies whether local protection is desired for the label switched path, and sending, by the first network device, the first resource reservation path message to a next hop network device toward the third network device along the label switched path. The method may also include, responsive to determining that the first resource reservation request message specifies that local protection is desired and responsive to receiving a resource reservation resv message from the next hop network device: establishing, by the first network device, a bypass label switched path between the first network device and a merge point network device along the label switched path, wherein the bypass label switched path bypasses a protected network resource positioned along the label switched path between the first network device and the merge point network device, generating, by the first network device, a second resource reservation path message that specifies that local protection has been established for the label switched path at the first network device, and sending, by the first network device and to the next hop network device along the label switched path, the second resource reservation path message.

In another example, a first network device includes one or more network interface cards and a control unit. The control unit is configured to receive, from a second network device using at least one of the one or more network interface cards, a first resource reservation path message for establishing a label switched path between the second network device and a third network device by way of the first network device such that the first network device is positioned between the second network device and the third network device along the label switched path, wherein the first resource reservation request message specifies whether local protection is desired for the label switched path, and send the first resource reservation path message to a next hop network device toward the third network device along the label switched path. The control unit is further configured to, responsive to determining that the first resource reservation request message specifies that local protection is desired and responsive to receiving a resource reservation resv message from the next hop network device: establish a bypass label switched path between the first network device and a merge point network device along the label switched path, wherein the bypass label switched path bypasses a protected network resource positioned along the label switched path between the first network device and the merge point network device, generate a second resource reservation path message that specifies that local protection has been established for the label switched path at the first network device, and send, to the next hop network device along the label switched path using at least one of the one or more network interface cards, the second resource reservation path message.

In another example, a computer-readable storage medium is encoded with instructions that, when executed, cause one or more programmable processors of a first network device to receive, from a second network device, a first resource reservation path message for establishing a label switched path between the second network device and a third network device by way of the first network device such that the first network device is positioned between the second network device and the third network device along the label switched path, wherein the first resource reservation request message specifies whether local protection is desired for the label switched path, and send the first resource reservation path message to a next hop network device toward the third network device along the label switched path. The instructions may further cause the one or more processors to, responsive to determining that the first resource reservation request message specifies that local protection is desired and responsive to receiving a resource reservation resv message from the next hop network device: establish a bypass label switched path between the first network device and a merge point network device along the label switched path, wherein the bypass label switched path bypasses a protected network resource positioned along the label switched path between the first network device and the merge point network device, generate a second resource reservation path message that specifies that local protection has been established for the label switched path at the first network device, and send, to the next hop network device along the label switched path, the second resource reservation path message.

In another example, a method includes receiving, by a first network device and from a second network device, a conditional pathtear message, wherein the second network device is positioned upstream from the first network device along a label switched path in a network. The method may also include, responsive to determining, by the first network device, that the first network device is a node protecting merge point network device for the second network device along the label switched path: retaining, with the first network device, state information for the label switched path, and sending, from the first network device to a third network device, a resource reservation path message that specifies local protection and node protection of the label switch path are no longer available at the second network device, wherein the third network device is a nexthop for the first network device in a downstream direction along the label switched path.

In another example, a network device includes one or more network interface cards and a control unit. The control unit is configured to receive, from a second network device using at least one of the one or more network interface cards, a conditional pathtear message, wherein the second network device is positioned upstream from the first network device along a label switched path in a network. The control unit is further configured to, responsive to determining that the first network device is a node protecting merge point network device for the second network device along the label switched path: retain state information for the label switched path, and send, to a third network device and using at least one of the one or more network interface cards, a resource reservation path message that specifies local protection and node protection of the label switch path are no longer available at the second network device, wherein the third network device is a nexthop for the first network device in a downstream direction along the label switched path.

In another example, a method includes determining, by a network device, that a hello session with a previous hop network device is down, wherein the network device and the previous hop network device a part of a label switched path in a network, and determining, by the network device, whether the network device is a merge point. The method may also include, responsive to determining that the hello session is down and determining that the network device is not the merge point: removing, by the network device, state information for the label switched path stored at the network device, and sending, by the network device, to a downstream network device, a conditional pathtear message.

In another example, a network device includes one or more network interface cards and a control unit. The control unit is configured to determine that a hello session with a previous hop network device is down, wherein the network device and the previous hop network device a part of a label switched path in a network, and determine whether the network device is a merge point. The control unit is further configured to, responsive to determining that the hello session is down and determining that the network device is not the merge point: remove state information for the label switched path stored at the network device, and send, to a downstream network device and using at least one of the one or more network interface cards, a conditional pathtear message, wherein the downstream network device is positioned downstream from the network device along the label switched path In another example, a method includes receiving, with a network device and from a previous hop network device, a pathtear message for a label switched path in a network, wherein the network device and the previous hop network device are label switched routers along the label switched path, responsive to determining, by the network device, that at least one of a next hop network device of the network device or a link between the network device and the next hop network device has failed, sending, by the network device to a next next hop network device of the network device in a downstream direction along the label switched path, a remote pathtear message instructing the next next hop network device to remove state information for the label switched path, and, responsive to determining that a link between the network device and the next hop has failed, sending, by the network device to the next hop network device, the remote pathtear message instructing the next hop network device to remove the state information for the label switched path.

In another example, a network device includes one or more network interface cards and a control unit. The control unit is configured to receive, from a previous hop network device and using at least one of the one or more network interface cards, a pathtear message for a label switched path in a network, wherein the network device and the previous hop network device are label switched routers along the label switched path, responsive to determining that a next hop network device of the network device has failed, send, to a next next hop network device of the network device in a downstream direction along the label switched path and using at least one of the one or more network interface cards, a remote pathtear message instructing the next next hop network device to remove state information for the label switched path, and, responsive to determining that a link between the network device and the next hop has failed, send, to the next hop network device, the remote pathtear message instructing the next hop network device to remove the state information for the label switched path.

In another example, a method includes receiving, by a first network device and from a second network device, a remote pathtear message, wherein the first network device and the second network device are part of a label switched path in a network, determining, by the first network device, whether the first network device is a merge point for the second network device, and, responsive to determining that the first network device is the merge point for the second network device, removing, by the first network device, path information for the label switched network stored by the first network device.

In another example, a first network device includes one or more network interface cards and a control unit. The control unit is configured to receive, from a second network device and using at least one of the one or more network interface cards, a remote pathtear message, wherein the first network device and the second network device are part of a label switched path in a network, determine whether the first network device is a merge point for the second network device, and responsive to determining that the first network device is the merge point for the second network device, remove path information for the label switched network stored by the first network device.

In another example, a method includes receiving, by a network device and from an upstream network device, a resource reservation path message to establish a label switched path, wherein the upstream network device is positioned upstream from the network device along the label switched path, and determining, by the network device, based on the resource reservation path message, whether the network device is a candidate merge point for the label switched path. The method may also include determining, by the network device, whether there is a remote Hello session between the network device and the upstream device, and, responsive to determining that the network device is a candidate merge point and determining that there is the remote Hello session with the upstream device, determining, by the network device, that the network device is a merge point for the upstream device.

In another example, a network device includes one or more network interface cards and a control unit. The control unit is configured to receive, from an upstream network device and using at least one of the one or more network interface cards, a resource reservation path message to establish a label switched path, wherein the upstream network device is positioned upstream from the network device along the label switched path, and determine, based on the resource reservation path message, whether the network device is a candidate merge point for the label switched path. The control unit is further configured to determine whether there is a remote Hello session between the network device and the upstream device, and, responsive to determining that the network device is a candidate merge point and determining that there is the remote Hello session with the upstream device, determine that the network device is a merge point for the upstream device.

In another example, a computer-readable storage medium is encoded with instructions that, when executed, cause one or more programmable processors of a first network device to receive, from an upstream network device, a resource reservation path message to establish a label switched path, wherein the upstream network device is positioned upstream from the network device along the label switched path, and determine, based on the resource reservation path message, whether the network device is a candidate merge point for the label switched path. The instructions may further cause the one or more processors to determine whether there is a remote Hello session between the network device and the upstream device, and, responsive to determining that the network device is a candidate merge point and determining that there is a remote Hello session with the upstream device, determine that the network device is a merge point for the upstream device.

The details of one or more examples are set forth in the accompanying drawings and the description below. Other features, objects, and advantages will be apparent from the description and drawings, and from the claims.

DETAILED DESCRIPTION

Figure 1:
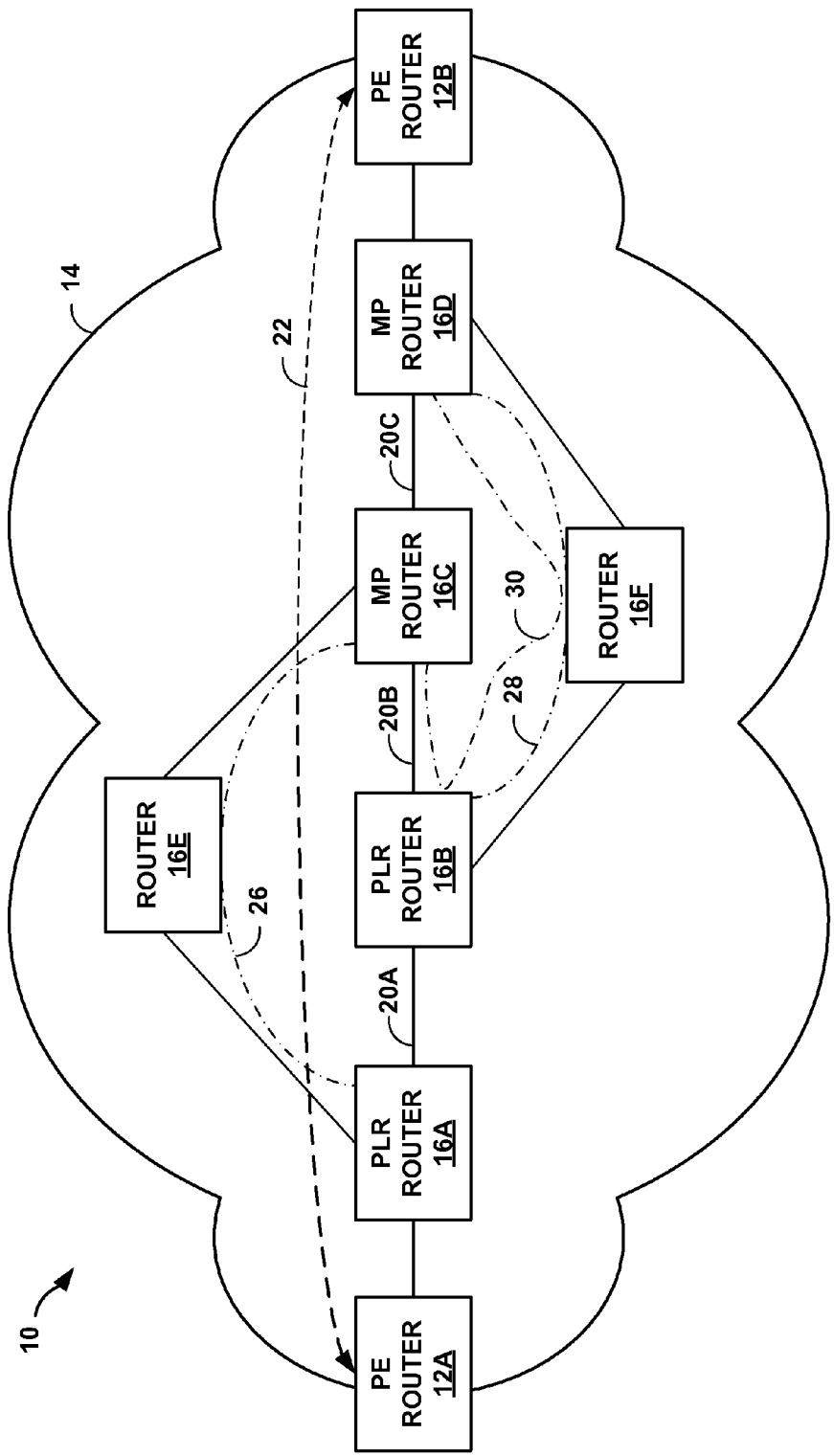
FIG. 1 is a block diagram illustrating an example system in which routers are configured to forward network traffic, in accordance with one or more techniques of this disclosure.

FIG. 1 is a block diagram illustrating an example network system 10 in which provider edge (PE) router 12A-B ("PE routers 12") and routers 16A-16F ("routers 16") of network 14 are configured to forward network traffic (e.g., network packets) in accordance with the techniques of this disclosure. In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

As shown in FIG. 1, routers 12, 16 operate a label switching routers (LSR) and utilize an MPLS protocol communicate label information so as to establish label switched path (LSP) 22. For purposes of example, techniques of this disclosure are described with respective to RSVP-TE, which represents an exemplary MPLS protocol in which LSRs allocate labels and communicate label information to other LSRs. Example details of RSVP are described in Awduche, D., Berger, L., Gan, D., Li, T., Srinivasan, V., and G. Swallow, "RSVP-TE: Extensions to RSVP for LSP Tunnels", RFC 3209, December 2001, the entire contents of which is incorporated herein by reference. Other example MPLS protocols for distribution of MPLS labels include the Label Distribution Protocol (LDP) and BGP when used to distribute label mapping information. Example details of these protocols are described in Andersson, L., Ed., Minei, I., Ed., and B. Thomas, Ed., "LDP Specification", RFC 5036, October 2007, and Rekhter, Y. and E. Rosen, "Carrying Label Information in BGP-4", RFC 3107, May 2001, the contents of each of which are incorporated herein by reference.

In the example of FIG. 1, router 16A is a point of local repair (PLR) router along label switched path (LSP) 22. In the example of FIG. 1, PLR router 16A is a transit router, i.e., an intermediate router, along LSP 22 and is neither an ingress router nor an egress router of LSP 22. In this example, PE router 12A is the ingress router of LSP 22 and PE router 12B is the egress router of LSP 22. LSP 22 extends along respective paths that pass through PLR router 16A, links 20A-20C ("links 20"), and router 16D.

PE routers 12 and routers 16 represent any network device that routes or otherwise forwards traffic through network 14 and that applies label swapping operations to the network traffic. Typically, routers 12, 16 represent a L3 packet-switching device that operates at L3 to exchange routing information using a routing protocol, such as an Interior Gateway Protocol (IGP), describing a current topology of network 14. Routers 12, 16 process this routing information, selecting paths through its representation of the topology of network 14 to reach all available destinations to generate forwarding information. In other words, routers 12, 16 may reduce these paths to so-called "next hops" which identify interfaces to which to forward traffic destined for a particular destination, where the forwarding information includes this list of next hops. Routers 12, 16 install the forwarding information in a forwarding plane of the respective router, whereupon the forwarding plane forwards received traffic in accordance with the forwarding information.

As shown in FIG. 1, PLR router 16A may have previously computed and signaled bypass LSP 26 as a backup path for protecting router 16B, such as by using the Resource Reservation Protocol with Traffic Engineering extensions (RSVP-TE). In this example, PLR router 16A is the point of local repair for bypass LSP 26, and router 16C is the merge point (MP) for bypass LSP 26. Bypass LSP 26 is a tunnel that provides node protection for router 16B between router 16A and router 16C, such that if router 16B should fail, PLR router 16A can establish a backup LSP over bypass LSP 26 and send the network traffic received along an existing LSP through the backup LSP. Router 16A may establish bypass LSP 26 in accordance with MPLS fast reroute techniques, as described in P. Pan, "Fast Reroute Extensions to RSVP-TE for LSP Tunnels," Network Working Group RFC 4090, May 2005, the entire contents of which is incorporated by reference herein.

For example, as the point of local repair and ingress of bypass LSP 26, router 16A may establish bypass LSP 26 to protect one or more other existing LSPs (such as LSP 22) that traverse at least router 16A and router 16B and do not traverse router 16E. In some examples, router 16A may establish bypass LSP 26 upon successful establishment of LSP 22. For example, router 16A may receive an RSVP-TE RESV from downstream router 16B and the RSVP-TE PATH previously received from upstream router 12A for LSP 22 contained "local protection desired" flag set in RSVP-TE SESSION_ATTRIBUTES object. After router 16A establishes bypass LSP 26, router 16A maintains forwarding information in a data plane of router 16A that allows router 16A to send traffic through bypass LSP 26 if router 16B fails.

Responsive to detecting a failed resource between PLR router 16A and merge point router 16C (e.g., failure of router 16B, in the example of FIG. 1), PLR router 16A may perform a reroute action to reroute for the traffic LSP 22 onto a previously established bypass LSP 26. For example, PLR router 16A may update its stored forwarding state to change the primary next hops for LSP 22, such as by setting a next hop for bypass LSP 26 as the primary next hop for traffic received for LSP 22.

RFC 4090 describes a facility backup method, which provides link or node protection by pre-calculating a bypass path for the set of LSPs traversing a link. For example, responsive to failure of router 16B, PLR router 16A redirects traffic over bypass LSP 26 via a backup LSP from PLR router 16A to MP router 16C. Because of the soft-state nature of RSVP, PLR router 16A is also expected to signal the backup LSPs along the bypass LSP 26 towards MP router 16C. These backup LSPs help in maintaining state across PLR router 16A and MP router 16C.

When attempting to scale RSVP-TE to establish and maintain a large number of LSPs (e.g., 50,000 LSPs, 100,000 LSPs, 500,000 LSPs, etc.), it may be become difficult for routers 16 to handle the rate of RSVP protocol messages that would be required to handle this large number of LSPs. The rate of RSVP protocol messages is influenced by both triggered and periodic messages. Triggered messages consist of initial PATH/RESV messages during LSP setup and PATH/RESV messages during backup LSP establishment after local repair (e.g., redirection of traffic over bypass LSP 26 following a failure of router 16B).

One mechanism to mitigate the RSVP message rate problem is to increase the refresh interval of LSP states so that the routers may prioritize backup LSP establishment and other triggered messages. If a large refresh time can be complemented with RSVP refresh reduction extensions defined in RFC 2961, then RSVP-TE implementation can these apply extensions to avoid rapid retransmits to reliably convey any new state or state change to neighboring router and avoid re-sending the entire message during refresh to neighboring router. Even though the combination of large refresh time and reliable message delivery is one potential solution described herein, there are additional challenges if the technique is applied to facility protection specified in RFC 4090, and the additional challenges are also addressed herein.

In examples where there is a large number of LSPs from PLR router 16A to merge point (MP) router 16D that transit routers 16C and 16D, the refresh interval may be configured to be large (e.g., on the order of minutes as opposed to seconds) and refresh reduction extensions are enabled on all routers 16. In the example shown in FIG. 1, node protection has been configured for the LSPs and the LSPs are protected by each router in the following way:
1. router 16A has made node protection available using bypass LSP 26; router 16A is the point of local repair and router 16C is Node Protecting Merge Point (NP-MP);
2. router 16B has made node protection available using bypass LSP 28; router 16B is the point of local repair and router 16D is the NP-MP; and
3. router 16C has made link protection available using bypass LSP 30; router 16C is the point of local repair and router 16D is the Link Protecting Merge Point (LP-MP).

Typically, if link 20B fails, the following is the sequence of events that is expected to occur for all protected LSPs under normal conditions:
1. router 16B performs local repair and re-directs the traffic for LSP 22 over the bypass LSP 28;
2. router 16B also creates backup state for the LSP and triggers sending of backup LSP state to router 16D over the bypass LSP 28;
3. router 16D receives backup LSP states and merges the backups with the protected LSPs; and
4. as the link on router 16C over which the LSP states are refreshed has failed (i.e., link 20B), router 16C will no longer receive state refreshes, which may result in the time out of the protected LSP states on router 16C will time out and router 16C will send tear down message for all LSPs.

However, this sequence of events may result in a number of additional challenges. For example, if the protected LSP on router 16C times out before router 16D receives signaling for the backup LSP, then router 16D would receive a PathTear message from router 16C prior to receiving signaling for the backup LSP, thus resulting in deleting the LSP state for LSP 22. As another example, if, upon the failure of link 20B, router 16C is to keep state until its timeout, then with long refresh interval (e.g., of at least one minute) this may result in a large amount of stale state on router 16C. Alternatively, if upon the failure of link 20B, router 16C is to delete the state and send a PathTear message to router 16D, router 16D would delete the state information, thus deleting LSP 22 from router 16D. As yet another example, if router 16A attempts to tear down LSP 22 after router 16B performs local repair and re-directs the traffic for LSP 22 but before router 16B create backup state for LSP 22 and triggers sending of backup LSP state to router 16D, then router 16B may receive the PathTear message before creating the backup state for the LSP and may delete the LSP state from its state database. As another example, if router 16B fails to perform local repair, then router 16B will delete the LSP state from its state database without informing router 16D.

In accordance with techniques of this disclosure, routers 12 and/or routers 16 may be configured to operate according to modified MPLS protocol signaling mechanisms, such as a modified RSVP-TE, so as to reduce or eliminate such problems. As one example, the techniques of this disclosure may enhance facility protection method defined in RFC 4090 by, for example, introducing a merge point determination mechanism that enables the point of local repair to signal availability of link or node protection to the MP. The techniques may also provide techniques for handling upstream link or node failures by cleaning up LSP states if the node has not determined that it is a merge point by using the merge point determination mechanism. Moreover, the techniques of this disclosure may also introduce extensions to enable a router to send tear down message to downstream router that enables the receiving router to conditionally delete its local state. In some examples, the techniques of this disclosure may also enhance facility protection by allowing a point of local repair to directly send tear down message to merge point without requiring the point of local repair to either have a working bypass LSP or have already refreshed backup LSP state. According to the techniques of this disclosure, the RSVP-TE extensions may be backwards compatible with routers along the LSP that do not support these modifications to the RSVP-TE protocol. In this way, techniques of this disclosure may enable support for longer refresh intervals, such as intervals that are longer than or equal to one minute in duration, including two minutes, five minutes, 10 minutes, etc. as specified in the RSVP PATH message.

Figure 2:
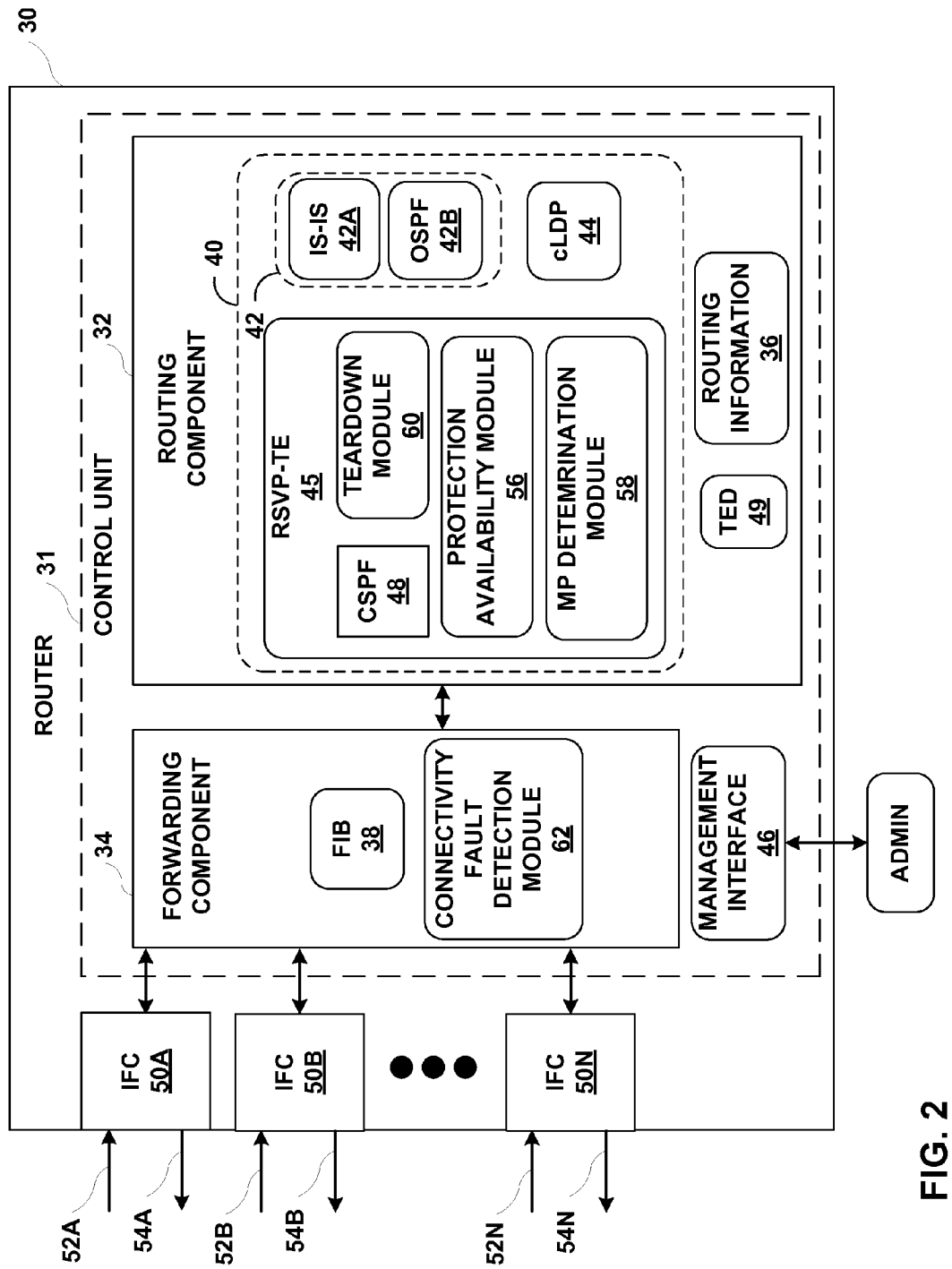
FIG. 2 is a block diagram illustrating an example embodiment of a network device, in accordance with one or more techniques of this disclosure.

FIG. 2 is a block diagram illustrating an example embodiment of a network device, in accordance with one or more techniques of this disclosure. Router 30 may, for example, represent any of routers 12 or 16 of FIG. 1, such as PLR router 16A or MP router 16C, for example. In this example, router 30 includes a control unit 31 that comprises a routing component 32 and a forwarding component 34. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54"). Router 30 also includes management interface 46 by which an administrator ("ADMIN"), script, or network management system can configure router 30. In some examples, management interface 46 may be presented locally, or may be used for receiving information by way of an Application Programming Interface (API) from a Software Defined Network (SDN) controller or Path Computation Element (PCE), for example.

Routing component 32 primarily provides an operating environment for control plane protocols 40. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which router 30 is connected. In particular, IGPs 42 update routing information 36 to accurately reflect the topology of the network and other entities. Router 30 may include other example routing protocols such as Border Gateway Protocol (BGP).

Routing component 32 generates and programs forwarding component 34 with FIB 38 that associates network destinations with specific next hops and corresponding interfaces ports of IFCs 50 in accordance with routing information 36. Routing component 32 may generate FIB 38 in the form of a radix tree having leaf nodes that represent destinations within the network, for example.

Based on FIB 38, forwarding component 34 forwards packets received from inbound links 52A-52N to outbound links 54A-54N that correspond to next hops associated with destinations of the packets. In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of router 30 can be found in U.S. Pat. No. 8,339,959, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database (TED) 49, including bandwidth reservations for paths associated with MPLS LSPs. Constrained Shortest Path First (CSPF) process 48 computes a shortest path or paths for an MPLS LSP based on specified constraints and bandwidth availability information associated with the links within the network. IGPs 42 may, in turn, advertise the calculated bandwidth availability information in TED 49 to other peer routers. As another example, constrained Label Distribution Protocol (CR-LDP) 44 may send and receive label mapping messages for establishing a LSP.

Router 30 receives RSVP-TE PATH messages from PE routers 12A for setting up LSP 22. In response, RSVP-TE 45 of router 30 forwards the RSVP-TE PATH messages to router 16B, and also sends RSVP-TE RESV messages back to PE router 12A confirming the reservation of the requested bandwidth. RSVP-TE 45 may also inform IGPs 42, which in turn can update TED 49 with current available bandwidth information. IGPs 42 may also forward the updated current available bandwidth information to other IGP peers. RSVP-TE 45 may also store MPLS labels to FIB 38 for LSP 22.

Subsequent to LSP 22 being established, router 30 may, in some examples, detect a failure condition of a link, such as link 20A of FIG. 1. For example, connectivity fault detection module 62 may run a session on link 20A, and can detect when link 20A fails. In some examples, the link 20A is managed by the kernel of router 30, and the routing protocol daemon (RPD) and/or RSVP-TE 45 is informed by the kernel if there is any change. RSVP-TE 45 will react depending on its configuration. In the example of a one-hop session (IGP) at a transit router adjacent to the failed link, then a Periodic Packet Management Daemon (PPMD) (not shown) of routing component 32 may delegate connectivity fault detection functionality to a forwarding component monitor module (e.g., pfemon). Otherwise, routing component 32 may do fault detection. Example techniques for connectivity fault detection in a multi-chassis routing system are described in U.S. Pat. No. 7,720,061, filed Aug. 18, 2006, entitled "Distributed Solution for Managing Periodic Communications in a Multi-Chassis Routing System," the entire contents of which are incorporated by reference herein. In some examples, in response to detecting a failure condition of a protected resource between router 30 and a merge point router (e.g., a failure of PLR router 16B positioned between PLR router 16A and MP router 16C as shown in FIG. 1), connectivity fault detection module 62 informs RSVP-TE 45 in the control plane of router 30 of the detected condition. In other examples, connectivity fault detection module 62 may detect a node failure condition, such as where an intermediate router is present on the path between the router 30 and a merge point router.

Although illustrated for purposes of example as being positioned in the forwarding component 34 (e.g., in the forwarding plane of router 30), connectivity fault detection module 62 could alternatively be located in the control plane of router 30, such as within routing component 32. In the case of connectivity fault detection module 62 being located in the control plane, connectivity fault detection module 62 may poll the forwarding component 34 for statistics and information, and compare the data received from forwarding component 34 to configured thresholds, for example. In one example, connectivity fault detection module 62 may comprise a software application programming interface (API) in the control plane of router 30 that notifies notify the control plane of the status of aspects of forwarding component 34, such as next hop utilization statistics, and forwarding component 34 responds by providing the requested statistics. In this case, connectivity fault detection module 62 might perform bookkeeping/accounting of bandwidth in the control plane, for example.

In accordance with the techniques of this disclosure, RSVP-TE 45 operates in accordance with an RSVP-TE protocol that has been extended to signal availability of link and/or node protection to a merge point and to enable RSVP-TE 45 to determine if router 30 is a merge point. Based on whether or not RSVP-TE 45 determines router 30 is a merge point router, RSVP-TE 45 may selectively clean up LSP states stored by router 30 when there is an upstream link or node failure. For example, RSVP-TE 45 may support extensions to the RSVP-TE protocol that may enable router 30 to send a tear down message to a downstream router, which may enable the downstream router to conditionally delete locate state information for the LSP. In some instances, router 30 may directly send a tear down message to a merge point router (e.g., MP router 16C of FIG. 1) even though router 30 may not have a working bypass LSP and/or may not have already refreshed backup LSP state information. According to the techniques of this disclosure, the RSVP-TE extensions may be backwards compatible with routers along the LSP that do not support these modifications to the RSVP-TE protocol.

RSVP-TE 45 includes protection module 56, merge point (MP) determination module 58, and teardown module 60. Protection module 56 set up link and/or node protection and determines whether router 30 has made node and/or link protection available. In an example where router 30 corresponds to router 16A of FIG. 1, router 30 receives a PATH message of PE router 12A to set up LSP 22. Using the SESSION_ATTRIBUTE object of the PATH message, PE router 12A signals to router 30 that local protection is desired (e.g., by setting a local protection flag of the SESSION_ATTRIBUTE object) and signals whether node protection is desired (e.g., by setting a node protection flag of the SESSION_ATTRIBUTE object). Responsive to receiving the PATH message, protection module 56 determines whether local protection and/or node protection for LSP 22 is desired. If local protection is desired, but not node protection, protection module 56 attempts to make link protection available for the LSP once the LSP establishment is determined to be successful upon receiving RESV message. If both local protection and link protection are desired for LSP 22, protection module 56 attempts to make node protection available upon receiving RESV message from downstream router. If protection module 56 successfully sets up node link protection, protection module 56 signals that node protection is available using a new PATH message and triggers the sending of the new PATH message. If protection module 56 successfully sets up link protection, protection module 56 signals that links protection is available using a new PATH message and triggers the sending of the new PATH message. If, after signaling local protection availability, protection module 56 determines that local protection is no longer available, protection module 56 may reset the record route object (RRO) flags relating to protection availability and trigger a PATH message, including the reset RRO flags, to be sent downstream.

MP determination module 58 determines whether or not router 30 is a merge point (e.g., MP router 16D) for a PLR router (e.g., router 16B). In examples where router 30 receives a PATH message (e.g., where router 30 is MP router 16D and receives the PATH message from router 16C of FIG. 1), MP determination module 58 determines whether the PATH message includes one or more RRO flags set to indicate that local protection is available. If the RRO flags indicate that local protection is available, then MP determination module 58 determines if there is remote RSVP-TE Hello session with the point of local repair (e.g., router 16B). A remote RSVP-TE Hello session exists when two routers (e.g., router 30 and router 16B) successfully exchange RSVP-TE Hello Request and Ack messages. That is, if router 30 sends an RVSP Hello Request message to router 16B and, in response, receives an RSVP Hello Ack message from router 16B, router 30 determines that a remote Hello session exists between router 30 and router 16B. In some examples, the remote Hello session may be between a router and a next next hop router or previous previous hop router (e.g., in the example of FIG. 1, between router 16A and router 16C, router 16B and 16D, etc.). If the RRO flags are set and the remote Hello session is present, then MP determination module 58 determines that router 30 is a merge point. If the PATH message does not include one or more RRO flags set to indicate that local protection is available or if MP determination module 58 determines that there is no remote Hello session with the point of local repair, MP determination module 58 determines that router 30 is not a merge point.

Teardown module 60 determines when and what type of teardown message to send and where to send the teardown message. Teardown module 60 may send one or more of a PathTear message, a remote PathTear message, and a conditional PathTear message. A conditional PathTear message is a mechanism by which router 30 signals to another router (e.g., router 16C of FIG. 1) that router 30 does not require the receiving router to unconditionally delete the LSP state immediately. The receiving router may delete the LSP state only if it is not a link protecting or a node protecting merge point. In other words, the receiving router may be configured to delete the LSP state if there is no "remote" point of local repair path state on the receiving router. A remote PathTear message is a mechanism by which router 30 may enable LSP state clean up while LSP 22 is being locally repaired. The remote PathTear message may be sent to the next next hop (i.e., the next hop of the next hop for the LSP) in instances of next hop node failure or to the next hop in instances of link failure between the node and the next hop node and instructs the receiving node to delete the LSP state information for LSP 22.

Figure 3:
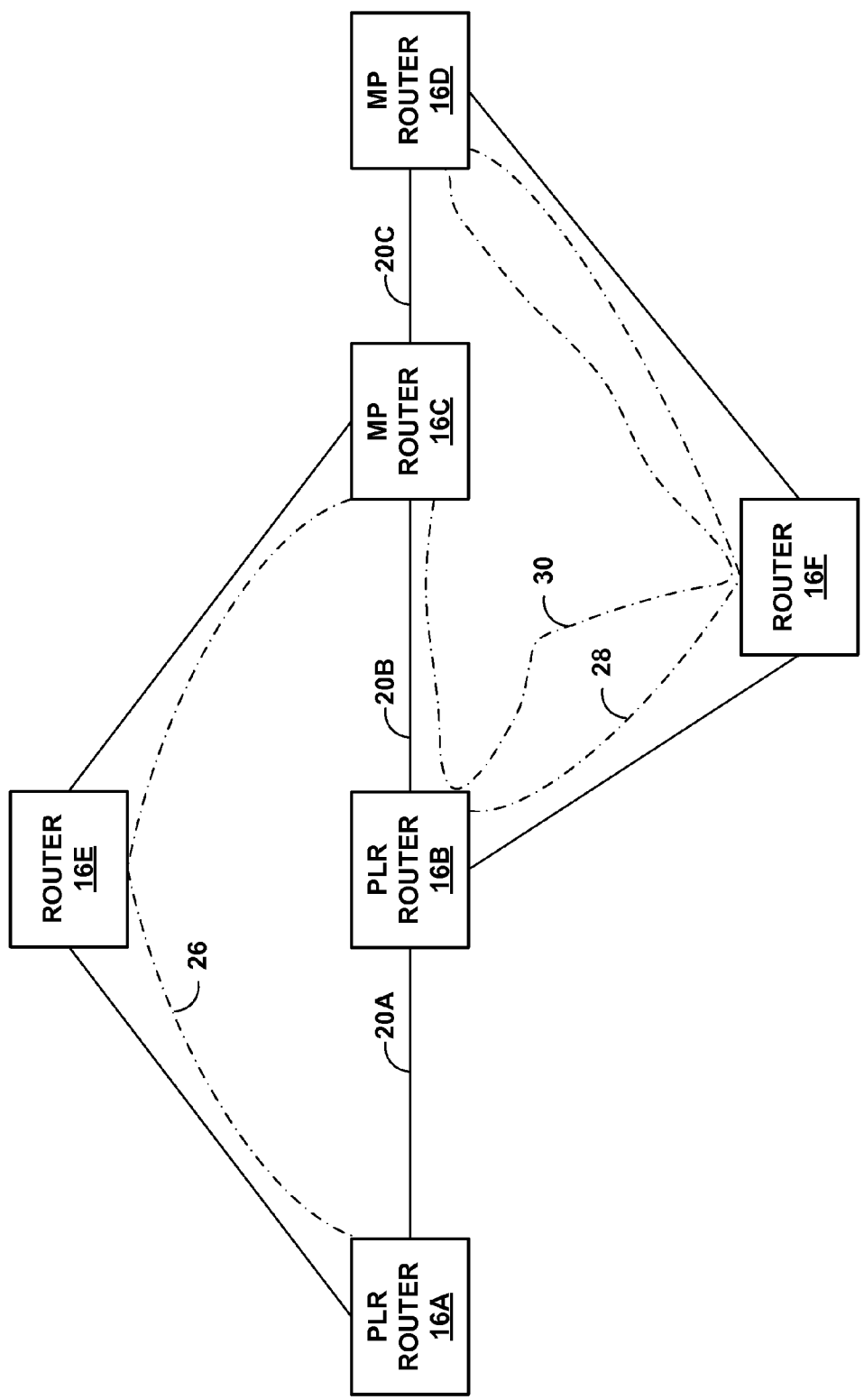
FIG. 3 is a block diagram illustrating an example system in which routers are configured to establish an LSP, in accordance with one or more techniques of this disclosure.

FIG. 3 is a block diagram illustrating an example system in which routers are configured to establish an LSP, in accordance with one or more techniques of this disclosure. Each of routers 16 may include elements substantially similar to those of router 30 of FIG. 2. PE router 12A may be configured to establish LSP 22 as a protected LSP to PE router 12B. In order to setup LSP 22 as a protected LSP, PE router 12A sends a PATH message that includes a SESSION_ATTRIBUTE object having a "local protection desired" flag set. If LSP were to be set up as a non-protected LSP, PE router 12A would sent a PATH message that does not have the "local protection desired" flag set in the SESSION_ATTRIBUTE of the PATH message.

As shown in FIG. 1, router 16A is the first router along the path to PE router 12B. Router 16A receives the PATH message from PE router 12A and determines whether PE router 12A is attempting to set up a protected LSP. A protection module of router 16A (e.g., protection availability module 56 of FIG. 2) analyzes the PATH message to determine if the SESSION_ATTRIBUTE object includes a flag indicating that local protection is desired. In the example shown in FIG. 2, the protection availability module determines that PE router 12A is attempting to set up a protected LSP (i.e., that the SESSION_ATTRIBUTE object includes the "local protection desired" set to indicate that location protection is desired.

An RSVP-TE protocol executing at router 16A (e.g., RSVP-TE 45 of FIG. 2) sends, via link 20A, a PATH message downstream (i.e., to router 16B) to continue the LSP setup process. The PATH message sent to router 16B includes the location protection flag of the SESSION_ATTRIBUTE object set the same way as was set in the PATH message router 16A received from PE router 12A. That is, if the PATH message router 16A received from PE router 12A indicated that local protection is desired, then the PATH message sent by router 16A also indicates that local protection is desired. Routers 16 each analyze the PATH message received from the upstream device and send PATH messages to downstream devices until PE router 12B (i.e., the egress router for the LSP) receives the PATH message. PE router 12B reserves resources and sends a RESV message back upstream to router 16D, which propagates the RESV message upstream to router 16C and so on until PE router 12A receives the RESV message. Once the LSP is established, any of routers 16 may periodically send RSVP refresh messages to refresh LSP state information on other routers 16.

Responsive to determining that location protection is desired, router 16A determines whether a node protection flag is set in the SESSION_ATTRIBUTE object. If the node protection flag is set, the RSVP-TE protocol attempts to create a node protection bypass LSP to the next next hop (i.e., router 16C) avoiding the next hop (i.e., router 16B) on the protected LSP path once the protected LSP establishment is successful with the arrival of RESV message from next hop router (i.e., router 16B). That is, router 16A establishes bypass LSP 26 that traverses router 16E and bypasses router 16B. Router 16A may establish bypass LSP 26 in accordance with MPLS fast reroute techniques, as described in RFC 4090. For example, as the point of local repair and ingress of bypass LSP 26, router 16A may establish bypass LSP 26 to protect, not only LSP 22, but also one or more other existing LSPs that traverse at least routers 16A and router 16B and do not traverse router 16E. After router 16A establishes bypass LSP 26, router 16A maintains forwarding information in a data plane of router 16A (e.g., in FIB 38) that allows router 16A to send traffic through bypass tunnel 26 if router 16B fails.

While selecting destination address of bypass LSP 26, router 16A may attempt to select the router ID of the next next hop or next hop router. If router 16A and the merge point router (i.e., router 16C) are in same IGP area and if the node ID is not included in the Record Route Object (RRO) of the RESV message received from router 16B, then router 16A may utilize TED 49 to determine the router ID from the interface address in RRO. If router 16A and the next next hop merge point are in different IGP areas, then router 16A may use the NodeID address of the next next hop merge point if the node ID is included in the RRO of the RESV message received from router 16B. If the node ID is not included in the RRO of the RESV message, then router 16A should use the node protecting merge point's interface address present in the RRO of the RESV message. Router 16A should use its router ID as the source address of bypass LSP 26 and may include its router ID as the node ID in the PATH RRO message.

If router 16A is not able to set up node protection after some period of time (i.e., node protection setup times out without bypass LSP 26 being setup), router 16A may attempt to create a link protection bypass LSP to the next hop router (i.e., router 16B). In the example shown in FIG. 2, router 16A is able to establish bypass LSP 26. In various instances, even though router 16A is able to establish bypass LSP 26, router 16A may be configured to also establish a link protection bypass LSP.

If the node protection flag is not set in the SESSION_ATTRIBUTE object, router 16A attempts to create a link protection bypass LSP without first attempting to create a node protection bypass LSP. In general, a link protection bypass LSP avoids the link between a router and the next hop (i.e., link 20A between router 16A and 16B). Additional details with respect to link-protection bypass LSPs will be discussed with respect to router 16C and link protection bypass LSP 30.

In parallel to the attempt to create a node protection bypass LSP or link protection bypass LSP, router 16A may initiate remote Hello session to the next next hop or next hop node to track the reachability of the node protecting merge point or the link protecting merge point after any failure. The address of the remote neighbor is derived in the same manner as the destination address of the node protection bypass LSP or link protection bypass LSP. If the node protection bypass LSP (i.e., LSP 26) comes up, then router 16A sets "local protection available" and "node protection available" RRO flags and triggers a new PATH message to be sent from router 16A to router 16B. If the link protection bypass LSP comes up, then router 16A would set "local protection available" RRO flag and trigger a new PATH message to be sent to PLR router 16B.

A node ID based Hello session is one in which the node ID is used in source and destination address fields in an RSVP Hello message. RFC 4558, "Node-ID Based Resource Reservation Protocol (RSVP) Hello: A Clarification Statement," by Ali et al., June 2006, the entire contents of which is incorporated by reference herein, formalizes node ID-based Hello messages between two neighboring routers. The new procedures defined in the previous section extends the applicability of node ID based Hello messages between two routers that may not have an interface connecting them for exchanging RSVP messages.

As mentioned above, router 16A sends a PATH message downstream to router 16B, where the PATH message includes the "local protection desired" flag set. Router 16B propagates the PATH message downstream until the PATH message reaches the egress router (e.g., PE router 12B of FIG. 1) for the protected LSP (e.g., LSP 22 of FIG. 1). The egress router sends a RESV upstream (e.g., to router 16D), indicating that the egress router has reserved resources for LSP 22. Router 16D also sends a RESV message upstream to router 16C.

Router 16C receives the RESV message from router 16D and determines that a link protection bypass LSP needs to be created. Router 16C initiates creation of a link protection bypass LSP (e.g., link protection bypass LSP 30), sends a Hello message to router 16D to establish a NodeID Hello session, and sends a RESV message to router 16B. Once router 16C determines that link protection bypass LSP 30 has been successfully created, router 16C sends a RESV message and a PATH message, each having an RRO flag set, indicating link protection is available for link 20C. Router 16C sends the RESV message upstream to router 16B and sends the PATH message downstream to router 16D. Router 16D receives the PATH message having the RRO "local protection available" flag and, based on the RRO flag, a merge point determination module of router 16D (e.g., merge point determination module 58 of FIG. 2) determines that router 16D is a link protecting merge point for router 16C.

When the next next hop (in the case of node protection) or next hop (in the case of link protection) router receives the triggered PATH with RRO flag(s) set, the router checks for the presence of a NodeID Hello session with point of local repair so that the router can detect if the network being partitioned. For example, if router 16D receives the triggered PATH message from router 16C, router 16D checks if it has the NodeID Hello session with router 16C. If the flags are set and the NodeID Hello session is present, router 16D determines that protection has been made available at router 16C. If router 16C has included a node ID in triggered PATH RRO, then the included node ID is the remote neighbor address. Otherwise, the interface address of router 16C as specified in the PATH RRO is used as the remote neighbor address. If the "node protection available" flag is set by the previous previous hop router (e.g., router 16B), then router 16D determines that it is a node protecting merge point. Otherwise, router 16D determines that it is a link protecting merge point.

Once a router determines it is a merge point (e.g., router 16D determines it is a link protecting merge point or router 16C determines it is a node protecting merge point), the router creates "remote" LSP path state information. The "remote" LSP state information is substantially the same as the protected LSP state except for a difference in the HOP object that contains the address of the NodeID Hello session with the point of local repair. The merge point router should automatically delete the "remote" state if:

the merge point is a node protecting merge point and it receives a PATH message later with "NP available" flag reset in the PATH RRO flags received from the point of local repair;

the merge point is a link protecting merge point and it receives a PATH message later with "local protection available" flag reset in the PATH RRO flags received from the point of local repair;

NodeID Hello session with the point of local repair goes down;

the merge point receives backup LSP signaling from the point of local repair, which overrides the "remote" state;

the merge point receives a PathTear message; or the merge point deletes the LSP state.

As mentioned above, when router 16C establishes link protection bypass LSP 30, router 16C sends a RESV message to router 16B. Router 16B receives the RESV message and initiates creation of a node protection bypass LSP (e.g., node protection bypass LSP 28), sends a Hello message to router 16D to establish a NodeID Hello session, and sends a RESV message to router 16A. Once router 16B determines that node protection bypass LSP 28 has been successfully created, router 16B sends a RESV message to router 16A and a PATH message to router 16C, each having an RRO flag set, indicating node protection is available. Router 16C receives the PATH message having the RRO "node protection available" flag set and propagates the PATH message. Router 16D receives the PATH message propagated by router 16C and a merge point determination module of router 16D (e.g., merge point determination module 58 of FIG. 2) determines that router 16D is a node protecting merge point for router 16B.

Router 16A receives the RESV message from router 16B and initiates the creation of a node protection bypass LSP (e.g., node protection bypass LSP 26) and sends a Hello message to router 16D to establish adjacency signaling. Once router 16A determines that node protection bypass LSP 26 has been successfully created, router 16A sends a PATH message to router 16B with an RRO flag set indicating node protection is available. Router 16B receives the PATH message having the RRO "node protection available" flag propagates the PATH message. Router 16C receives the PATH message propagated by router 16B and a merge point determination module of router 16C (e.g., merge point determination module 58 of FIG. 2) determines that router 16C is a node protecting merge point for router 16A. However, router 16C does not propagate the PATH message to router 16D.

Whenever a router receives a PATH message, the router should check if the only change is in RRO flags. If the change is only in PATH RRO flags, then the router should decide whether to propagate the PATH based on the following rules:

If "node protection desired" flag is set and "node protection available" flag has changed in previous hop's RRO flags, then PATH is triggered; and In all other cases the change is not propagated.

In general, when the next next hop router or next hop router receives the triggered PATH with RRO flag(s) set, the router determines that protection has been made available at the point of local repair. As an additional check to detect whether the network is partitioned, the router may check for the presence of a NodeID Hello session with the point of local repair. If the point of local repair has included a node ID in the PATH RRO, then that node ID is the remote neighbor address. Otherwise, the point of local repair's interface address in specified in the PATH RRO is used as the remote neighbor address. If the "NP available" flag is set by previous previous hop router, the router that receives the propagated PATH message determines it is a node protecting merge point. Otherwise, the router determines that it is a link protecting merge point. However, a router may be both a link protecting merge point and a node protecting merge point. As shown in FIG. 3, router 16D is a link protecting merge point for router 16C and link protection bypass LSP 30 as well as a node protecting merge point for router 16B and node protection bypass LSP 28.

Techniques of this disclosure also provide for backwards compatibility for routers that do not support the enhanced fast reroute (FRR) facility protection techniques described herein. In this disclosure, enhanced FRR facility protection may also be referred to as "enhanced facility protection" or "enhanced fast reroute." Routers configured in accordance with the backwards compatibility techniques may support backward compatibility for a subset of LSPs configured on the routers. That is, a router may simultaneously support both LSPs that only traverse routers that support the FRR enhancements described herein, LSPs that traverse routers that only support conventional FRR techniques, and LSP that traverse some routers that only support conventional FRR techniques and routers that support the FRR enhancements described herein.

There are at least two possible approaches to determine whether nodes along the LSP path support enhanced facility protection specified in previous sections. The first approach is based on signaling enhancement where any router implementing the FRR enhancements would set a new flag (e.g., an "enhanced facility protection" flag) in the RRO carried in PATH and RESV messages to indicate support for the FRR enhancements. Using this approach, a router may determine whether a previous previous hop or previous hop router supports the FRR enhancements based on the PATH RRO flags included in PATH messages received from the previous previous hop or previous hop. Similarly, a router may determine whether a next next hop or next hop router supports the FRR enhances based on the RESV RRO flags included in RESV messages received from the next next hop or next hop. In some examples, any router that sets the "enhanced facility protection" flag may also set a Refresh-Reduction-Capable flag in the common header of all RSVP messages. The Refresh-Reduction-Capable flag indicates that the router supports increased refresh intervals of LSP states (e.g., refresh intervals of at least one minute).

Figure 4:
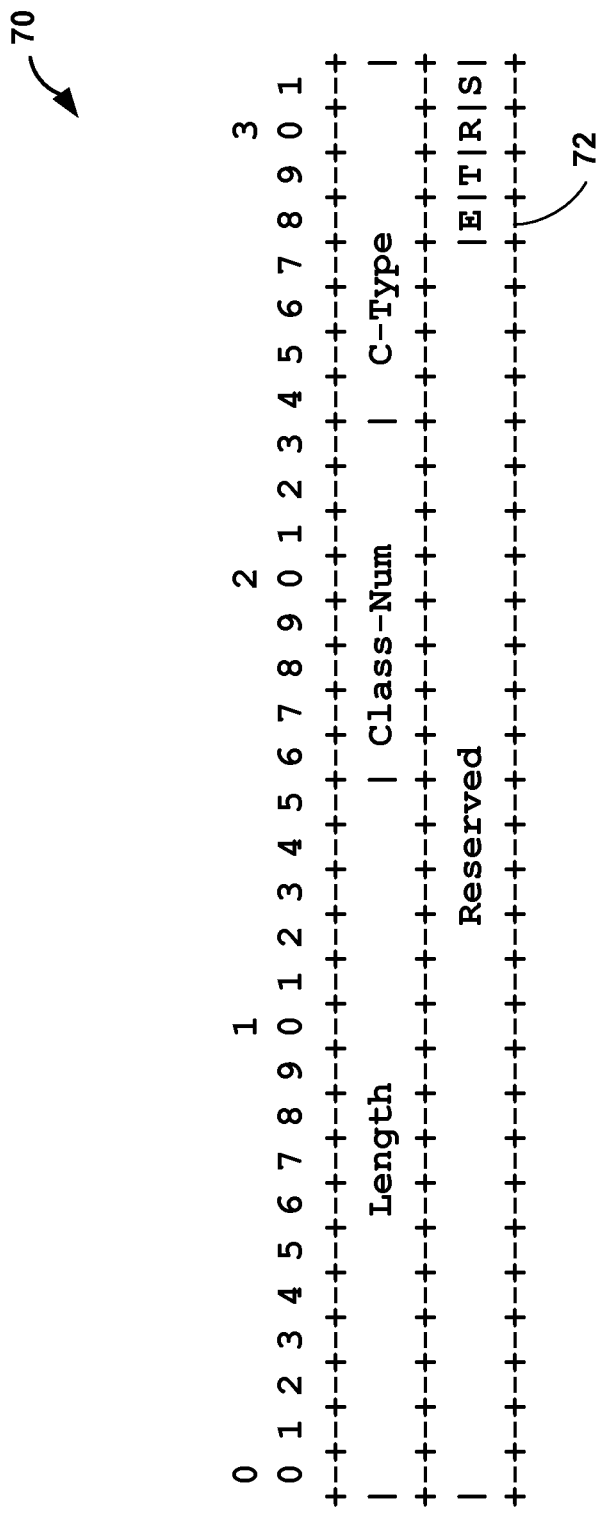
FIG. 4 is a conceptual diagram illustrating an example capability object of a HELLO message, in accordance with one or more techniques of this disclosure.

The second approach for providing backward compatibility is based on advertising support for FRR enhancements by setting a new flag "Enhanced facility protection" in the CAPABILITY object of Hello messages. The format of the CAPABILITY object of a Hello message is shown in FIG. 4. As a router that supports the FRR enhancements typically initiates Hellos with an adjacent router, the router can determine whether a previous hop or next hop neighbor supports the FRR enhancements based on the Hello messages sent by the neighbor. If a router attempts to make node protection available, then the point of local repair may initiate a remote NodeID Hello session with the next next hop. If the next next hop (a) does not reply to a remote Hello message or (b) does not set the "Enhanced facility protection" flag in the CAPABILITY object in the reply, then the point of local repair determines that the next next hop does not support FRR enhancements. If node protection is requested for an LSP and if (a) the previous previous hop router has not set "local protection available" and "NP available" flags in its RRO flags or (b) the previous previous hop router has not initiated remote Hello messages, then the router determines that the point of local repair does not support FRR enhancements.

If one or more downstream routers do not support the FRR enhancements, a router may generate PATH messages with different parameters than if the downstream routers supported the FRR enhancements. For example, if the next hop router does not support enhanced facility protection, then the router may reduce the "refresh period" in TIME_VALUES object carried in PATH messages to a default small refresh time value. If node protection is requested and the next hop router or the next next hop router does not support the FRR enhancements, then the router may reduce the "refresh period" in TIME_VALUES object carried in PATH to default value. If the router reduces the refresh time, the router may also refrain from sending Remote PathTear and/or Conditional PathTear messages.

As one example, consider the example topology in FIG. 2. If router 16C does not support enhanced facility protection, then routers 16A and 16B should reduce the refresh time to a shorter time period, such as 10 seconds, 30 seconds, 45 seconds, etc. and trigger sending of a PATH message. If router 16B is not an merge point and if the previous hop link of router 16B fails (e.g., link 20A), router 16B cannot send a Conditional PathTear to router 16C but may allow the LSP state from router 16A to time out normally. This would be accomplished if router 16A would also reduce the refresh time to a default value. That is, if router 16C does not support enhanced facility protection, then previous hop router 16B and previous previous hop router 16A should each reduce the refresh time specified in the PATH messages to a default value that is shorted that would otherwise be specified.

If one or more upstream routers do not support the FRR enhancements, a router may generate RESV messages with different parameters than if the upstream routers supported the FRR enhancements. For example, of the previous hop router does not support enhanced facility protection, then the router should reduce the "refresh period" in TIME_VAL-UES object carried in RESV to a default small refresh time value. If node protection is requested and the previous hop router does not support the FRR enhancements, then the router should reduce the "refresh period" in TIME_VAL-UES object carried in PATH to a default value. If node protection is requested and the previous previous hop node does not support the FRR enhancements, then the router should reduce the "refresh period" in TIME_VALUES object carried in RESV to a default value. If the router reduces the refresh time from the above procedures, the router may also refrain from performing the merge point determination procedures described herein.

After signaling protection availability, if router 16A determines that the protection is unavailable (e.g., due to a link and/or node failure), router 16A may attempt to make protection available. That is, if bypass LSP 26 becomes unavailable, router 16A may attempt to establish a different bypass LSP. Router 16A may wait for a time out before resetting RRO flags relating to protection availability and triggering a new PATH message to be sent downstream. If router 16A is able to establish an alternate bypass LSP, router 16A need not wait for the time out to set RRO flags relating to protection availability and may immediately trigger a new PATH message to be sent downstream.

FIG. 4 is a conceptual diagram illustrating an example capability object of a HELLO message, in accordance with one or more techniques of this disclosure. As discussed with respect to FIG. 3, one mechanism by which a router may provide backwards compatibility includes modifying the CAPABILITY object of Hello messages. The Hello message includes a common header, an INTEGRITY object, a HELLO object, a RESTART CAP object, and a CAPABILITY object.

As shown in FIG. 4, CAPABILITY object 70 includes a Length field, a Class-Num field, a C-Type field, a Reserved portion, and a series of flag bits—E, T, R, and S. The Length field specifies the length of the CAPABILITY object. The Class-Num field specifies the class number for the object. As the CAPABILITY object is assigned the class number of 134, the Class-Num field is set to 134. The C-Type field indicates the class type for the object within the class number. The CAPABILITY object is assigned class type 1, so the C-type field is set to 1. The reserved portion of the capability object is reserved for future use. The T-bit is the RecoveryPath Transmit Enabled bit and when set (i.e., is the value 1), the T bit indicates that the sending node is enabled to send RecoveryPath messages. The R-bit is the Recovery-Path Desired bit that, when set, indicates that the sending node desires to receive RecoveryPath messages. The S-bit is the RecoveryPath Srefresh Capable bit. In combination with the R-bit, the S-bit indicates that the sending node is capable of receiving and processing Srefresh messages with the RecoveryPath Flag set in the MESSAGE_ID LIST object.

In accordance with the techniques of this disclosure, the CAPABILITY object is modified to include E-bit 72. E-bit 72 is created by using one bit from the reserved space. E-bit 72 indicates that the sender supports enhanced FRR facility protection. If E-bit 72 is set (i.e., the value of E-bit 72 is 1), the sender is indicating that it supports enhanced FRR facility protection. If E-bit 72 is not set (i.e., the value of E-bit 72 is 0), the sender is indicating that it does not support enhanced FRR facility protection. In this way, the CAPA-BILITY object of the Hello message may be used to signal whether or not a node supports the enhanced facility protection techniques described in this disclosure. If the sender has not included CAPABILITY object in Hello message, then the sender is considered not to support enhanced FRR facility protection.

Figure 5:
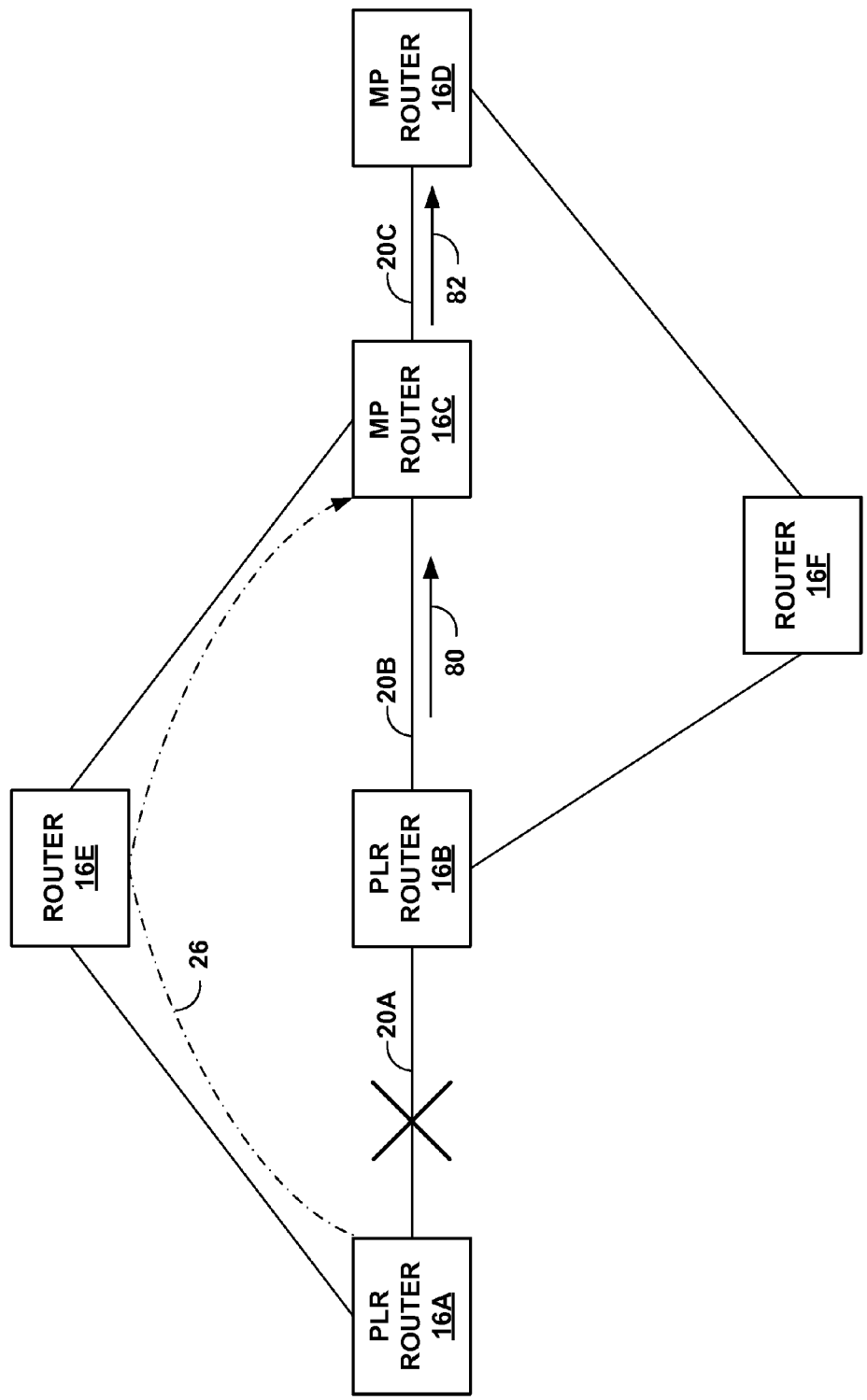
FIG. 5 is a block diagram illustrating an example system in which routers are configured to respond to a link failure, in accordance with one or more techniques of this disclosure.

FIG. 5 is a block diagram illustrating an example system in which routers are configured to respond to a link failure, in accordance with one or more techniques of this disclosure. As shown in FIG. 5, router 16A has become unavailable due to the failure of link 20A and router 16B is not a link protecting or a node protecting merge point. As router 16B is not a merge point, when router 16B detects that router 16A has become unavailable along the previously established LSP path (i.e., due to link or node failure), router 16B sends a Conditional PathTear message 80 to router 16C via link 20B and deletes the LSP state information for the LSP.

Routers 16 may detect when a neighboring node becomes unavailable by exchanging Hello messages. For example, router 16B may send a Hello Request message to router 16A and router 16A responds with a Hello Ack message. If router 16B does not receive a Hello Ack message in response to the Hello Request message within a configured timeout period, router 16B may determine that router 16A is unavailable. In general, a neighboring node may become unavailable due to a link and/or node failure.

When the link to a point of local repair fails (e.g., link 20A between routers 16A and 16B), the link Hello session to the point of local repair (e.g., between routers 16A and 16B) will fail whereas the remote NodeID Hello session to the point of local repair will remain up (e.g., between routers 16A and 16C). Because the remote NodeID Hello session remains up, the merge point will retain state until a refresh timeout because of the presence of "remote" path state. However, if router 16B were to send a typical PathTear message, then router 16C would delete LSP state upon receipt of the PathTear message instead of retaining the state information. In order to avoid router 16C prematurely deleting the state information, router 16B includes a new optional object in the PathTear message. A PathTear message that includes the optional object is referred to herein as a "Conditional Path Tear" message. If router 16C also understands the new object, then router 16C should delete LSP state only if it is not a node protecting merge point. In other words, router 16C should delete LSP state if there is no "remote" point of local repair path state on router 16C.

A node (e.g., router 16B) may send a Conditional PathTear if router 16B determines to delete the LSP state under the following conditions:
  the LSP ingress (e.g., PE router 12A of FIG. 1) requested node protection for the LSP; and
  the node has not received a PathTear message from an upstream node; and
  the node is not a merge point and the previous hop link or previous hop NodeID Hello session goes down.
The node may send a Conditional PathTear message upon deleting the LSP state information stored at the node in order for the node's next hop node to retain state if the next hop node is a node protecting merge point. In other words, in the example of FIG. 5, router 16B sends a Conditional PathTear message to router 16C when PE router 12A requested node protection for LSP 22, router 16B has not received a conventional PathTear message from router 16A or any other upstream router, and the link or node Hello session with router 16A goes down.

If router 16B were to receive a Conditional PathTear message, router 16B is configured to delete its LSP state information and process the Conditional PathTear as a normal PathTear message because router 16B is not a node protecting merge point. Router 16B may not propagate the Conditional PathTear message downstream (i.e., to router 16C) but, instead, removes the optional object and sends a normal PathTear message downstream.

When router 16C receives the Conditional PathTear message from router 16B, router 16C does not immediately delete its LSP state information. Instead, router 16C checks whether router 16B previously set "NP available" flag in the PATH message RRO flags. If router 16B previously set the flag, then router 16C should clear "local protection available" and "NP available" flags in the PATH message RRO flags and trigger sending the PATH message downstream (e.g., to router 16D).

Techniques of this disclosure also provide for backwards compatibility for nodes that do not support the enhanced facility protection techniques described herein. For example, if a Conditional PathTear message is received from a neighbor that has not advertised support for enhanced facility protection, then the node processes the message as normal PathTear message, propagates a normal PathTear message downstream, and delete its LSP state information. In other words, if router 16C did advertise enhanced facility protection in Hello messages, but propagated a Conditional PathTear message to router 16D, which does support enhanced facility protection, router 16D may ignore the new object defining the PathTear message as a Conditional PathTear message and process the Conditional PathTear message as if it were a normal PathTear message. That is, router 16D may delete its LSP state information and propagate a normal PathTear message downstream.

If an upstream link that is not attached to a node protecting merge point fails and the node protecting merge point receives a Conditional PathTear message from the previous hop node, then the merge point may retain the LSP state information as long as the remote NodeID Hello session with the point of local repair is up because the Conditional PathTear from the previous hop node will not impact the "remote" path state from the point of local repair. For example, if link 20A fails, router 16C receives a Conditional PathTear message from router 16B. As router 16C is the node protecting merge point for router 16A and bypass LSP 26, router 16C is configured to retain the LSP state information as long as routers 16A and 16C are able to continue to exchange Hello messages (i.e., as long as the remote NodeID Hello session with the point of local repair is up). If router 16C does not receive a Hello Ack in response to a Hello Request (e.g., the remote Hello session is down), router 16C may delete the LSP state information.

In the example shown in FIG. 5, assume routers 16C and 16D are node protecting merge points for routers 16A and 16B, respectively. When link 20A fails, as router 16B is not a merge point and its previous hop link Hello session has failed, router 16B deletes its LSP state information. In the data plane, that would require router 16B to delete the label forwarding entry corresponding to LSP 22. So if router 16B's downstream nodes (i.e., router 16C and 16D) continue to retain LSP state information, it would not be correct for router 16D to continue to assume that it is the node protecting merge point for router 16B. There are several different ways to address this problem. In one example, as router 16B had previously signaled node protection availability, router 16B may signal lack of node protection availability before sending the Conditional PathTear message to router 16C. Router 16B may trigger a PATH message, wait for a PATH Ack in response to the PATH message, and, in response to receiving the PATH Ack, send the Conditional PathTear message to router 16C. Router 16B may include both PATH with updated RRO flags and Conditional PathTear in a message bundle.

As another example, router 16B may send a Conditional PathTear message 80 to router 16C via link 20B and let router 16C interpret the Conditional PathTear message as implicit signaling of the lack of node protection availability. In this example, router 16C should then update the PATH RRO flags for router 16B to signal router 16D that node protection is no longer available on router 16B. In general, to process to update the PATH RRO flags includes router 16B sending a Conditional PathTear to router 16C and deleting its LSP state information. When router 16C receives the Conditional PathTear, router 16C determines that it should retain the LSP state information because router 16C had previously determined that it is a node protecting merge point for router 16A. Router 16C also determines whether router 16B had previously signaled availability of node protection to router 16C. As shown in FIG. 5, router 16B had previously signaled node protection availability in its PATH RRO flags. Accordingly, router 16C resets the "local protection available" and "NP available" flags in the PATH RRO flags corresponding to router 16B and triggers propagation of the PATH message 82 to router 16D via link 20C. When router 16D receives the triggered PATH message, router 16D determines that it is no longer a node protecting merge point and deletes the "remote" state information. However, router 16D does not propagate the triggered PATH message further downstream because the only change in the triggered PATH message is in PATH RRO flags of router 16B.

If, at a later time, link 20A comes back up, router 16A may attempt to revert LSP 22 to traversing the original path rather than using bypass LSP 26. Router 16A may attempt to re-establish LSP 22 by at least signaling the same LSP instance to router 16B (e.g., using a PATH message). Router 16B receives the PATH message, creates LSP state information for LSP 22 and propagates the PATH message to router 16C. In instances where router 16C determines that it retained state information for LSP 22, router 16C sends a RESV message to router 16B and does not propagate the PATH message downstream.

Router 16B attempts to re-establish node protection (e.g., bypass LSP 28 via router 16F as shown in FIG. 3). Once node protection becomes available again, router 16B sets the "node protection available" flag in the RRO flags of a PATH message and sends the PATH message to router 16C. Router 16C receives the PATH message and determines that the RRO flags have changed as compared to the previously received PATH message. Responsive to determining that the RRO flags have changed, router 16C propagates the PATH message to router 16D. Router 16D receives the propagated PATH message, determines, based on the "node protection available" flag in the PATH message, that it is a node protecting merge point for router 16C, and recreates the "remote" LSP path state information.

As the refresh timeout of the LSP state information may be high (e.g., minutes), LSP state needs to be cleaned up properly even after local repair. If the ingress router (e.g., PE router 12A) intends to tear down the LSP or if the point of local repair is unable to perform local repair, it would not be desirable to wait for backup LSP signaling to perform state cleanup. To enable LSP state cleanup when LSP is being locally repaired, nodes should send "remote" tear down message instructing the receiving node to delete LSP state.

For example, if, after link 20A fails, router 16A is unable to perform a local repair, router 16A sends a Remote PathTear message to router 16C as router 16C is the node protecting merge point for router 16A. As described above, in response to determining that link 20A failed, router 16B deletes the LSP state information and sends a Conditional PathTear message to router 16C. If router 16C only received the Conditional PathTear message from router 16B, router 16C would maintain LSP state information so long as the remote NodeID Hello session with router 16A is up. However, because router 16C also received a Remote PathTear message from router 16A, router 16C deletes the LSP state information and sends a normal PathTear message to router 16D. Router 16D processes the Remote PathTear message just like any other normal PathTear message in as much as router 16D deletes the LSP state information.

Figure 6:
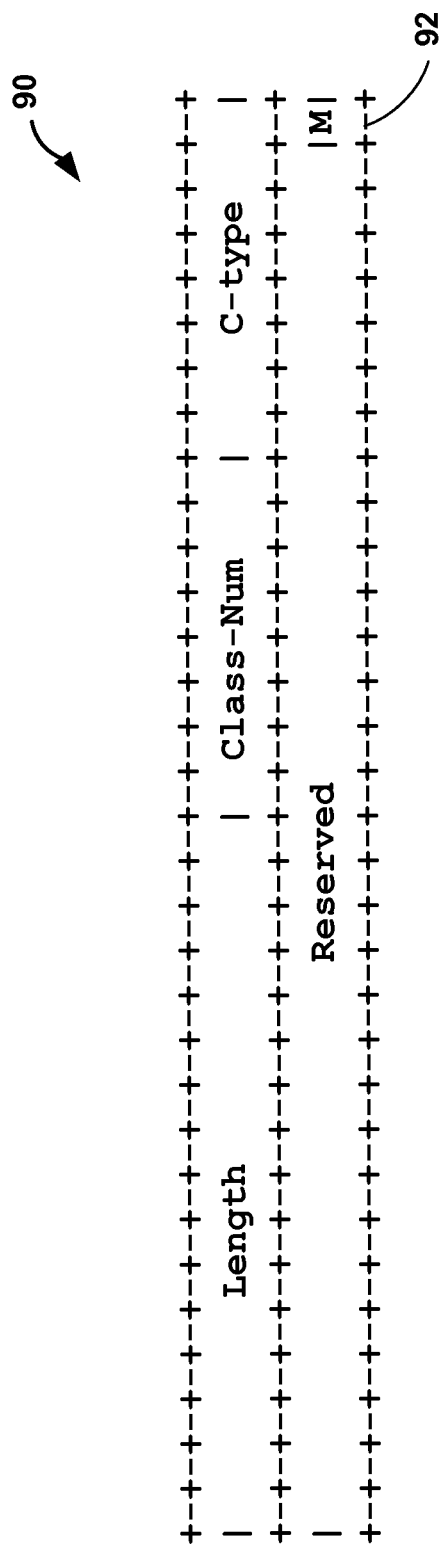
FIG. 6 is a conceptual diagram illustrating an example conditions object, in accordance with one or more techniques of this disclosure.

FIG. 6 is a conceptual diagram illustrating an example conditions object, in accordance with one or more techniques of this disclosure. As described with respect to FIG. 5, a Conditional PathTear message includes a new object that specifies that the PathTear message is a Conditional PathTear object. The Conditional PathTear message shown in FIG. 6 includes a Length field, a Class-Num field, a C-Type field, a Reserved portion, and a new object, conditions object 92. The Length field specifies the length of the CAPABILITY object. The Class-Num field specifies the class number for the object. In order to provide backwards compatibility (e.g., enable any RSVP-TE implementation that does not support Conditional PathTear to ignore the new object but process the message as normal PathTear without generating any error), the Conditions object is assigned the class number of 188, the Class-Num field is set to 188. The C-Type field indicates the class type for the object within the class number. For the Conditions object messages, the C-Type field is set to 1. The reserved portion of the capability object is reserved for future use.

M-bit 92 is a single bit and specifies the conditions under which default processing rules of the RSVP message should be invoked. That is, conditions object 90 with M-bit 92 being set to 1 indicates that the PathTear message should be processed based on whether the receiving node is a merge point. If the receiving node is a merge point (i.e., a link protecting merge point or a node protecting merge point), the receiving node will retain the LSP state information so long as the remote NodeID Hello session with point of local repair is up. If the receiving node is not a merge point, then the receiving node will delete the LSP state information.

Figure 7:
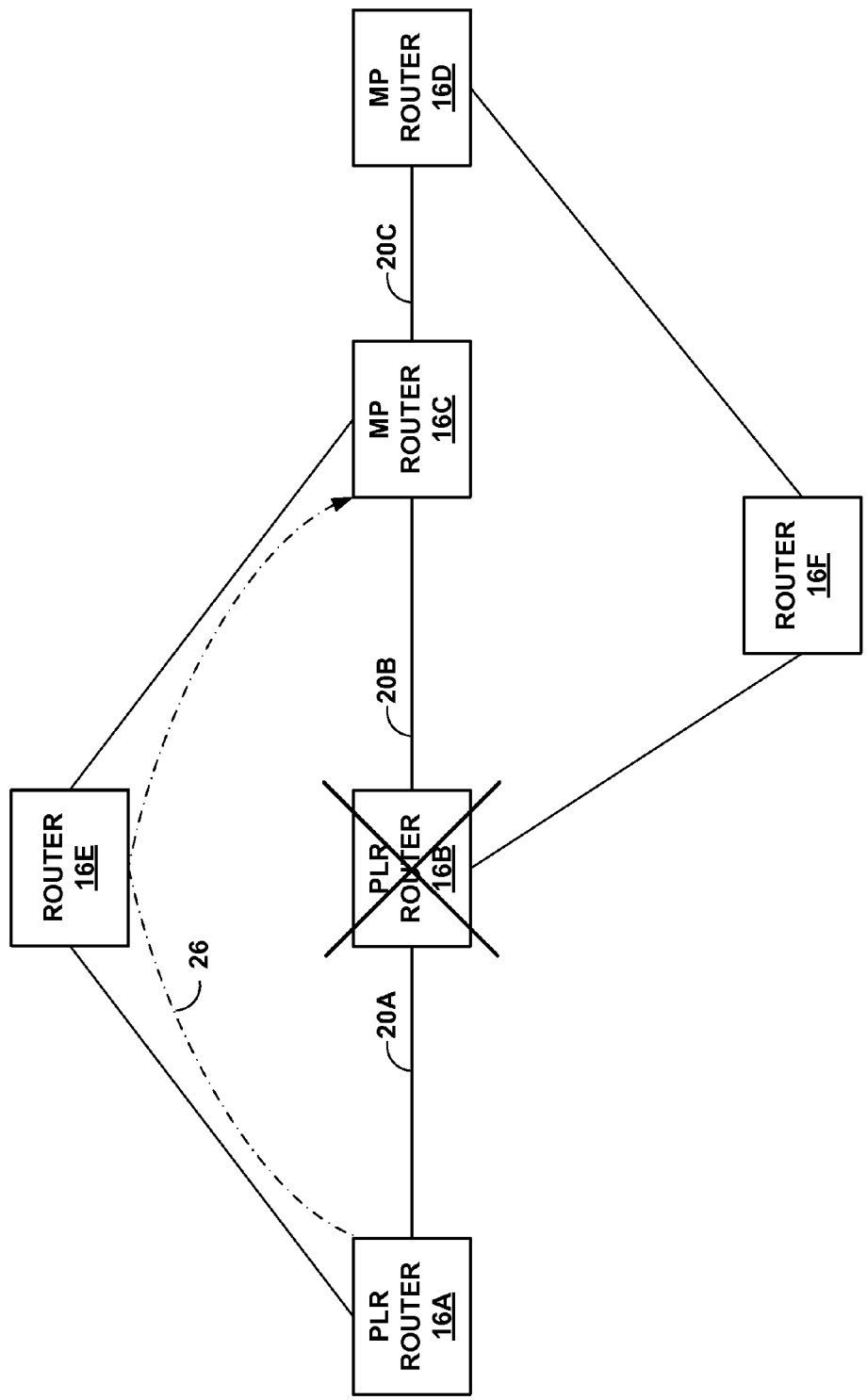
FIG. 7 is a block diagram illustrating an example system in which routers are configured to respond to a node failure, in accordance with one or more techniques of this disclosure.

FIG. 7 is a block diagram illustrating an example system in which routers are configured to respond to a node failure, in accordance with one or more techniques of this disclosure. In the example shown in FIG. 7, router 16A has established bypass LSP 26 and has node protection enabled. Router 16C is the node protecting merge point for router 16A.

As shown in FIG. 7, router 16B has failed. Router 16A, which is the point of local repair, performs local repair. That is, router 16A updates LSP 22 to include bypass LSP 26 such that LSP 22 traverses router 16A, 16E, and 16C rather than router 16A, 16B, and 16C. When router 16B fails, the link Hello session from router 16C to router 16B will fail, but the remote NodeID Hello session between router 16C and router 16A (the point of local repair) remains up as router 16A performed local repair. As router 16C is the node protecting merge point for router 16A, so long as the remote NodeID Hello session between router 16C and 16A remains up, router 16C will retain the LSP state information.

With the failure of router 16B, router 16D determines that the remote NodeID Hello session with router 16B has failed. Based on the remote NodeID Hello session failure, router 16D deletes the "remote" LSP path state information. However, because router 16D continues to receive RSVP refresh message from router 16C and link Hello session with router 16C is up, router 16D maintains LSP state information for LSP 22.

At a later point in time, router 16B comes back up. Router 16A determines that router 16B is back up and re-signals the same LSP instance in an attempt to re-establish LSP 22 traversing the path along routers 16A, 16B, and 16. That is, router 16A sends a PATH message to router 16B, instructing router 16B to re-establish LSP 22. Router 16B receives the PATH message, creates LSP state information for LSP 22, and propagates the PATH message to router 16C. In instances where router 16C determines that it retained state information for LSP 22, router 16C sends a RESV message to router 16B and does not propagate the PATH message downstream.

Router 16B attempts to re-establish node protection (e.g., bypass LSP 28 via router 16F as shown in FIG. 3). Once node protection becomes available again, router 16B sets the "node protection available" flag in the RRO flags of a PATH message and sends the PATH message to router 16C. Router 16C receives the PATH message and determines that the RRO flags have changed as compared to the previously received PATH message. Responsive to determining that the RRO flags have changed, router 16C propagates the PATH message to router 16D. Router 16D receives the propagated PATH message, determines, based on the "node protection available" flag in the PATH message, that it is a node protecting merge point for router 16C, and recreates the "remote" LSP path state information.

If, after router 16B fails, router 16A is unable to perform a local repair, router 16A sends a Remote PathTear message to router 16C as router 16C is the node protecting merge point for router 16A. As router 16C received an explicit PathTear requesting state deletion, router 16C deletes the LSP state information and sends a normal PathTear message to router 16D. Router 16D process the normal PathTear message just like any other normal PathTear message in as much as router 16D deletes the LSP state information.

An LSP may be preempted by a new LSP. Details of how one LSP may be preempted by another LSP are described in J. do Oliveira, "Label Switched Path (LSP) Preemption Polices for MPLS Traffic Engineering," Network Working Group RFC 4829, April 2007, and M. Meyer, "MPLS Traffic Engineering Soft Preemption," Internet Engineering Task Force RFC 5712, January 2010, the entire contents of each of which is incorporated by reference herein. In instances where an LSP is preempted when there is no failure along the path of the LSP, the node on which preemption occurs sends PathErr and ResvTear upstream and deletes the forwarding state. If the LSP is being locally repaired and if the failure has occurred upstream to the node on which the LSP is preempted, then the node would not be able to send PathErr or ResvTear upstream.

As one example, LSP 22 is preempted on router 16C after router 16B has failed, but before router 16A establishes bypass LSP 26. As router 16C has retained LSP state information because router 16A refreshes LSP 22 using signaling traversing bypass LSP 26, preemption of LSP 22 brings down LSP 22 and router 16C ceases being a node protecting merge point. As router 16C is no longer be a node protecting merge point, router 16C needs to remove the LSP state information for LSP 22. Router 16C deletes its reservation on link 20C by, for example, sending a normal PathTear message to router 16D, but router 16C cannot send PathErr or ResvTear to router 16A because backup LSP 26 has not yet been signaled by router 16A.

As router 16C retained LSP state information after router 16B failed because router 16C was a node protecting merge point, router 16C may send normal PathTear to router 16D and delete the LSP state information. Router 16D may also delete state on receiving PathTear from router 16C. Router 16A starts backup LSP signaling to router 16C. But as router 16C does not have the LSP state information for LSP 22, router 16C rejects backup LSP PATH and sends a PathErr to router 16A. Router 16A deletes its reservation and sends ResvTear to router 12A.

Figure 8:
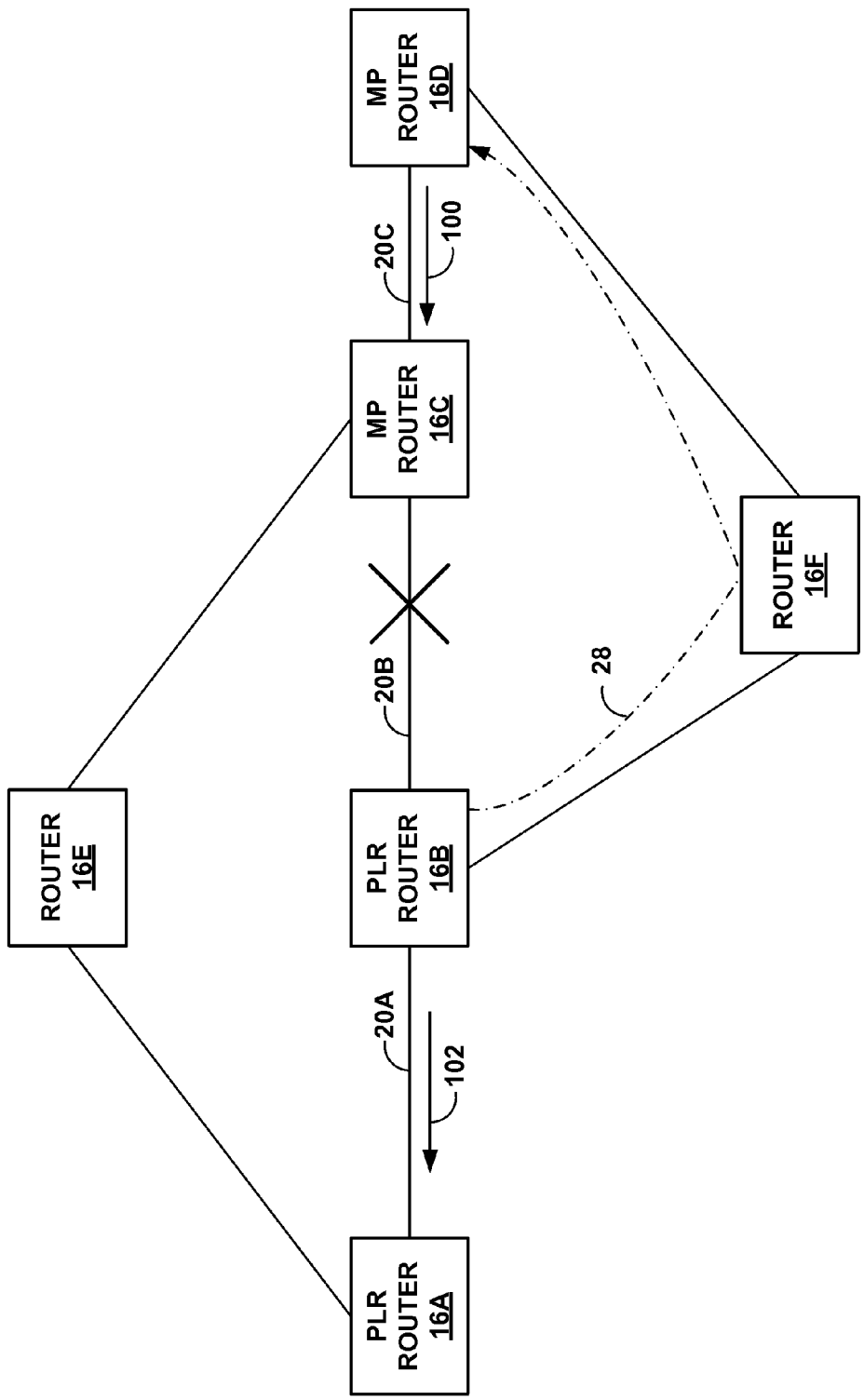
FIG. 8 is a block diagram illustrating an example system in which routers are configured to respond to a different link failure, in accordance with one or more techniques of this disclosure.

FIG. 8 is a block diagram illustrating an example system in which routers are configured to respond to a different link failure, in accordance with one or more techniques of this disclosure. In the example shown in FIG. 8, router 16B has established bypass LSP 28 and has node protection enabled. Router 16D is the node protecting merge point for router 16B.

In some instances, router 16B is unable to perform local repair (i.e., router 16B failed to bring up bypass LSP 28). With the failure of link 20B and the local repair failure, router 16B sends a PathErr and ResvTear message 102 to router 16A via link 20A, a Remote PathTear to router 16D, and deletes LSP state information for LSP 22. Router 16D receives the Remote PathTear, deletes state information for LSP 22, and sends a ResvTear message 100 to router 16C via link 20C. As LSP 22 goes down on router 16C (i.e., because router 16B was unable to perform local repair) and as link 20B is already down, router 16C deletes LSP state information for LSP 22.

In the example topology in FIG. 8, assume both router 16A has made node protection available and router 16C has concluded it is a node protecting merge point. When link 20B fails, router 16C retains LSP state as it is a node protecting merge point. As router 16B has made node protection available, router 16B will eventually complete backup LSP signaling with its corresponding node protecting merge point router 16D. At the completion of backup LSP signaling, the RRO of the LSP carried in RESV message sent by router 16B to router 16A will not include information for router 16C but will include information for router 16B and router 16D. When router 16A processes the RESV message with the new RRO values, which do not include information for the former node protecting merge point of router 16A (i.e., router 16C), router 16A may send Remote PathTear to router 16C. When router 16C receives the Remote PathTear message from its corresponding point of local repair router 16A, router 16C sends a normal PathTear message to router 16D and deletes the LSP state stored at router 16C. As router 16D had already completed backup LSP signaling with its point of local repair (i.e., router 16B), router 16D will have backup path state and will ignore the normal PathTear from router 16C.

Figure 9:
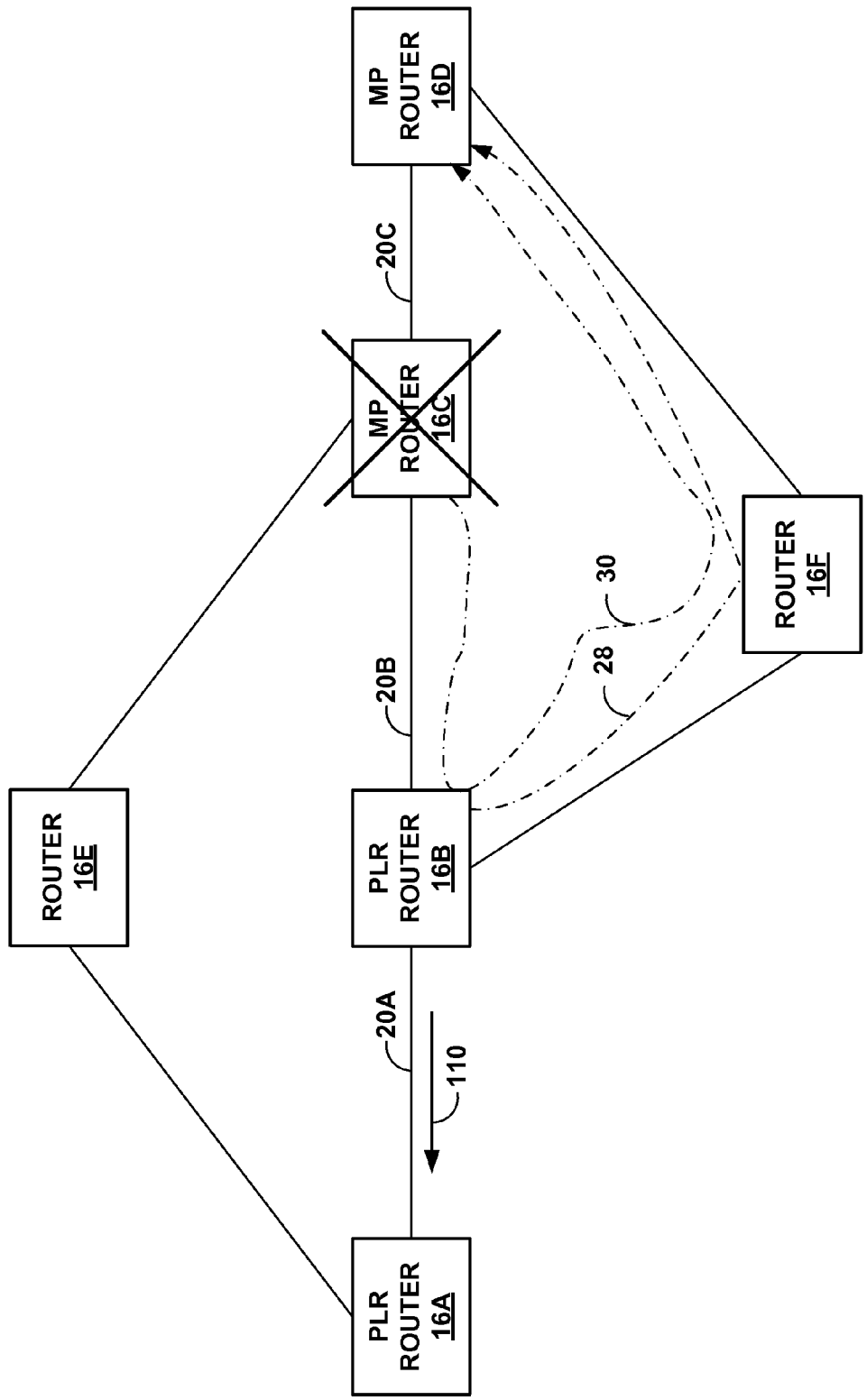
FIG. 9 is a block diagram illustrating an example system in which routers are configured to respond to a different node failure, in accordance with one or more techniques of this disclosure.

FIG. 9 is a block diagram illustrating an example system in which routers are configured to respond to a different node failure, in accordance with one or more techniques of this disclosure. In the example shown in FIG. 9, router 16B has established bypass LSP 28 and has node protection enabled and router 16C has established bypass LSP 30 and has link protection enabled. Router 16D is the node protecting merge point for router 16B and the link protecting merge point for router 16C.

As shown in FIG. 9, router 16C has failed. In general, when the NodeID Hello session between router 16D and router 16C (which is the point of local repair for the link protection) goes down, router 16D sends a normal PathTear message and deletes the LSP state. If router 16D, which is both a link protecting merge point and a node protecting merge point, detects the failure of router 16C, then router 16D retains LSP state until an RSVP refresh timeout.

In one example, router 16C has gone down and router 16B has not signaled backup LSP 28 to router 16D. If router 16A intends to tear down LSP 22, then router 16A sends normal PathTear to router 16B. To enable LSP state cleanup, router 16B sends a Remote PathTear to router 16D. The Remote PathTear includes a destination IP address set to that of router 16D and a HOP object that includes the local address used in remote NodeID Hello sessions with router 16D. Because router 16D maintains a NodeID Hello session with router 16B, router 16D accept the Remote PathTear from router 16B and deletes the LSP state information for LSP 22. In this way, routers 16 may clean up the LSP state information on all nodes along the path of the LSP 22.

In some instances, router 16B is unable to perform local repair (i.e., router 16B failed to bring up bypass LSP 28). With the failure of router 16C and the local protection failure of router 16B, router 16B sends a PathErr and a ResvTear message 110 to router 16A via link 20A, a Remote PathTear message to router 16D, and deletes LSP state information for LSP 22. Router 16D receives the Remote PathTear and deletes state information for LSP 22. That is, all nodes downstream of and immediate to the failure clean up LSP state information for LSP 22. However, router 16A may retain the LSP path state block without any forwarding entry in its forward tables.

Figure 10:
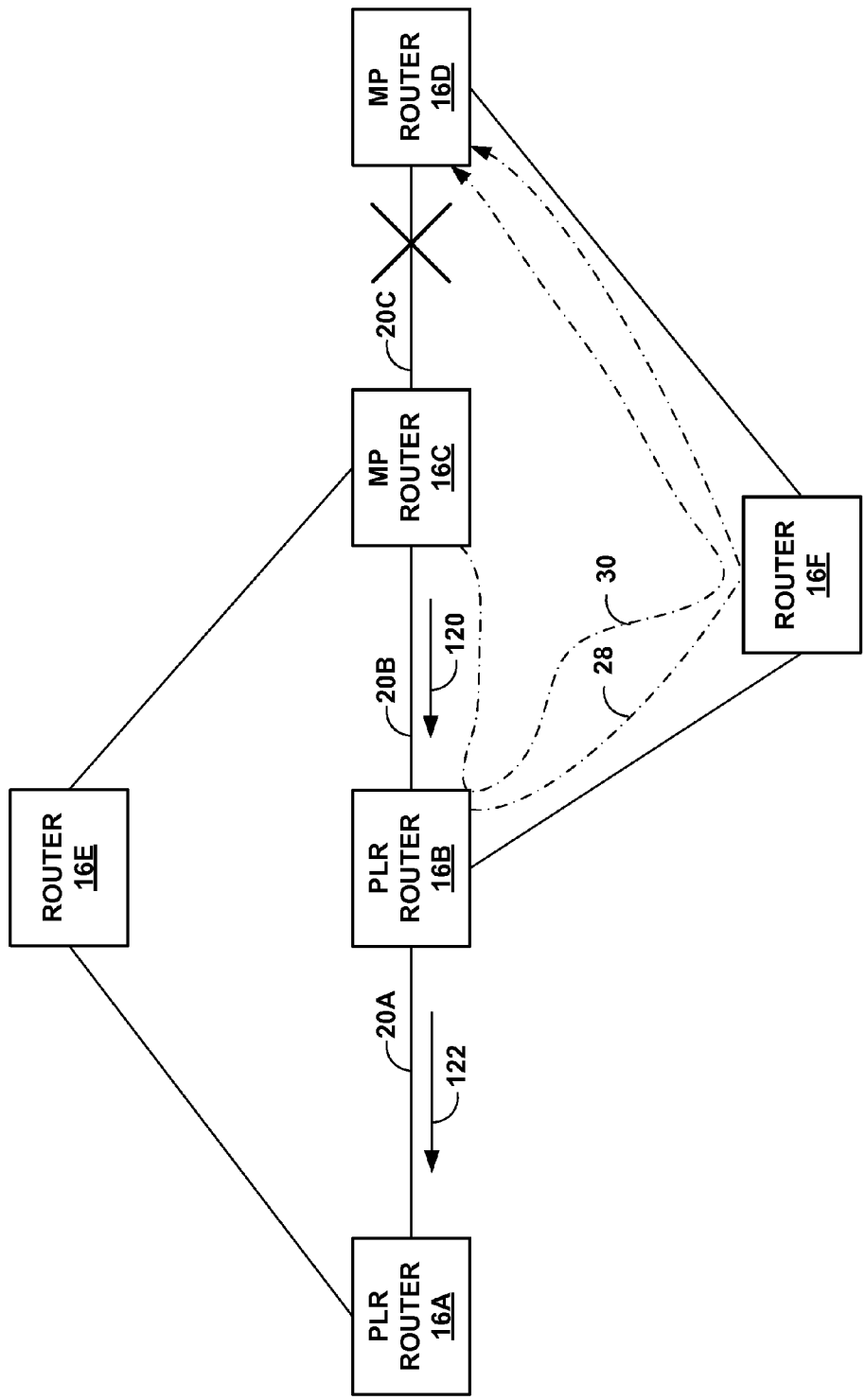
FIG. 10 is a block diagram illustrating an example system in which routers are configured to respond to another, different link failure, in accordance with one or more techniques of this disclosure.

FIG. 10 is a block diagram illustrating an example system in which routers are configured to respond to another, different link failure, in accordance with one or more techniques of this disclosure. In the example shown in FIG. 10, router 16B has established bypass LSP 28 and has node protection enabled and router 16C has established bypass LSP 30 and has link protection enabled. Router 16D is the node protecting merge point for router 16B and the link protecting merge point for router 16C.

As shown in FIG. 10, link 20C has failed. When link 20C fails, the link Hello session between routers 16C and 16D also fails whereas the NodeID Hello session between routers 16B and 16D remains up. As such, router 16D retains the LSP state information for LSP 22. Moreover, router 16D retains LSP state information for LSP 22 because router 16C has made link protection available.

If LSP 22 is preempted on router 16D after router 16C or link 20C has already failed, but before the respective one of the backup LSPs has been signaled over bypass LSPs 28 and 30, then router 16D sends a normal PathTear downstream and deletes the LSP state information for LSP 22. As router 16D has retained LSP state information for LSP 22 because the point of local repair for the particular type of failure (i.e., the respective one of routers 16B and 16C) would refresh the LSP through backup LSP signaling, preemption would bring down LSP 22 and router 16D would no longer be a link protection or node protecting merge point, requiring router 16D to clean up LSP state.

In some instances, router 16C is unable to perform local repair (i.e., router 16C failed to bring up a backup LSP or bypass LSP 30). Such a failure may trigger LSP state clean up from router 16C to the egress router (e.g., PE router 12B of FIG. 1). That is, with the failure of link 20C and the local protection failure of router 16C, router 16C sends a PathErr and a ResvTear message 120 to router 16B via link 20C, a Remote PathTear message to router 16D, and deletes LSP state information for LSP 22. Router 16D receives the Remote PathTear and deletes state information for LSP 22. Responsive to receiving the ResvTear message from router 16C, router 16B brings down LSP 22 and sends a ResvTear to router 16A. Similarly, responsive to receiving the ResvTear message from router 16B, router 16A brings down LSP 22.

Figure 11:
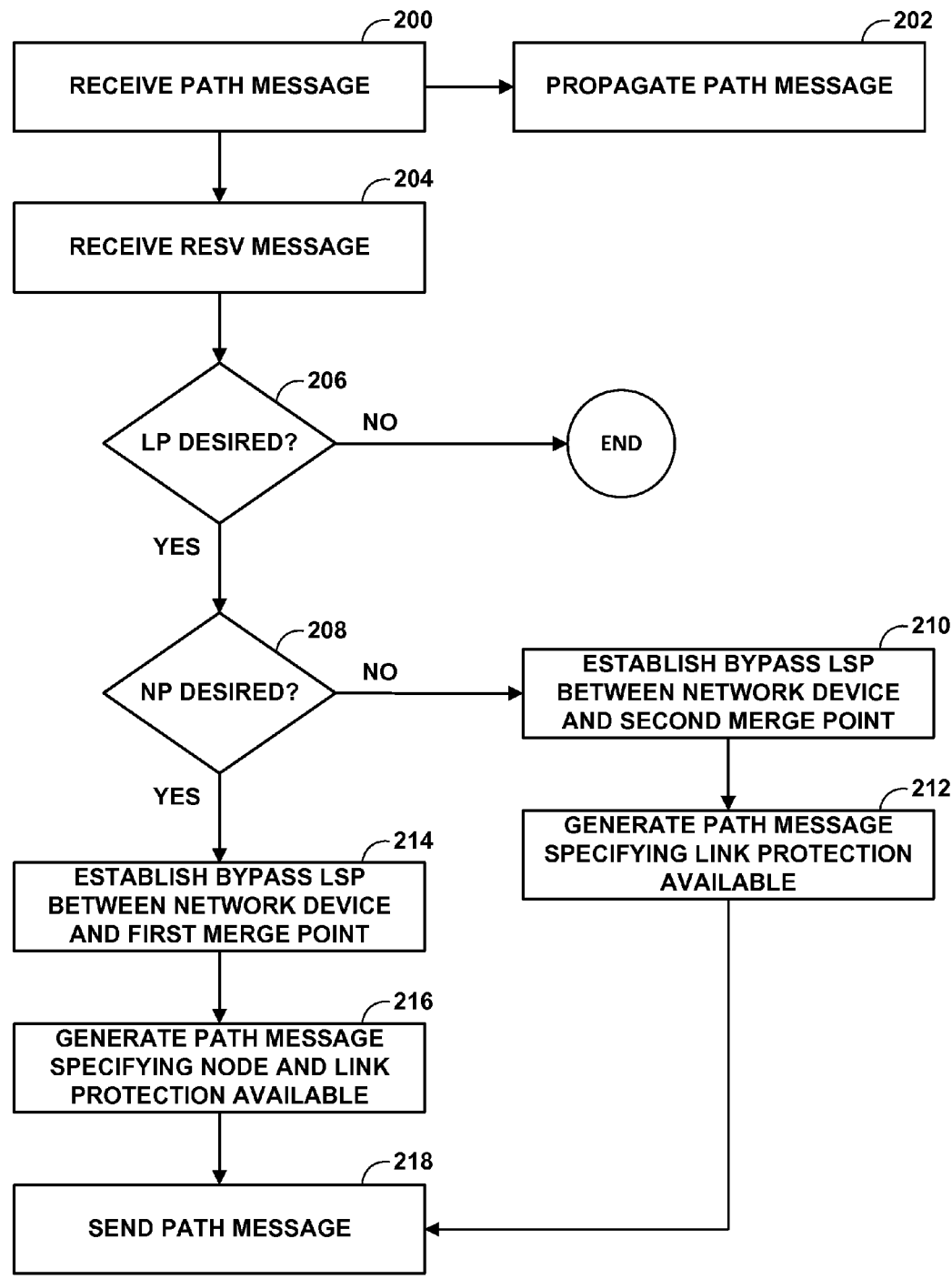
FIGS. 11-14 are flowcharts illustrating example operations of network devices in accordance with the techniques of this disclosure

FIG. 11 is a flowchart illustrating an example operation of network devices in accordance with one or more techniques of this disclosure. For purposes of illustration, FIG. 11 will be described with reference to FIGS. 1 and 2. For example, FIG. 11 refers to a point of local repair network device and a merge point network device, which, in one example, maybe PLR router 16A and MP router 16C of FIG. 1. Router 16A is described as having the elements of router 30 shown in FIG. 2.

Router 16A receives a PATH message from the LSP ingress, PE router 12A, to set up LSP 22 (200). PE router 12A signals whether local protection is by selectively setting a flag of the SESSION_ATTRIBUTE object of the PATH message. Router 16A propagates the PATH message downstream (202) to continue to set up the LSP. PE router 12B (i.e., the egress router for the LSP) receives the PATH message and sends back a RESV message indicating that the LSP is being established. Router 16A receives a RESV message from an downstream router (e.g., router 16B) indicating that the LSP is setup downstream of router 16A (204). Responsive to receiving the RESV message, protection module 56 of router 16A may determine whether local protection is desired for LSP 22 (206). Protection module may analyze the received PATH message in response to receiving the RESV message or may analyze the PATH message in response to receiving the PATH message. In either instance, if protection module 56 of router 16A determines that local protection is not desired ("NO" branch of 206), router 16A does not attempt to set up link protection or node protection.

If protection module 56 determines that local protection is desired ("YES" branch of 202), protection module 56 determines whether node protection is desired (208). While illustrated as two separate decisions with the node protection determination following the local protection determination, protection module 56 may determine whether local protection and/or node protection is desired in parallel or in any order. If protection module 56 determines that node protection is not desired ("NO" branch of 208), RSVP-TE 45 attempts to establish a bypass LSP between router 16A and router 16B once the protected LSP establishment is determined to be successful based on the arrival of RESV message from the next hop router (i.e., router 16B) (210). In instances where RSVP-TE 45 establishes the bypass LSP, RSVP-TE 45 generates a PATH message indicating that link protection is available (212) and sends the PATH message to router 16B (218).

In the example shown in FIG. 1, protection module 56 determines that node protection is desired ("YES" branch of 208). Responsive to determining that node protection is desired ("YES" branch of 208), protection module 56 attempts to make node protection available by establishing bypass LSP 26 between router 16A and router 16C (214). If protection module 56 successfully sets up node link protection, protection module 56 signals that node protection is available by generating a new PATH message indicating that node protection is available (216) and sends the PATH message downstream to router 16B (218).

Figure 12:
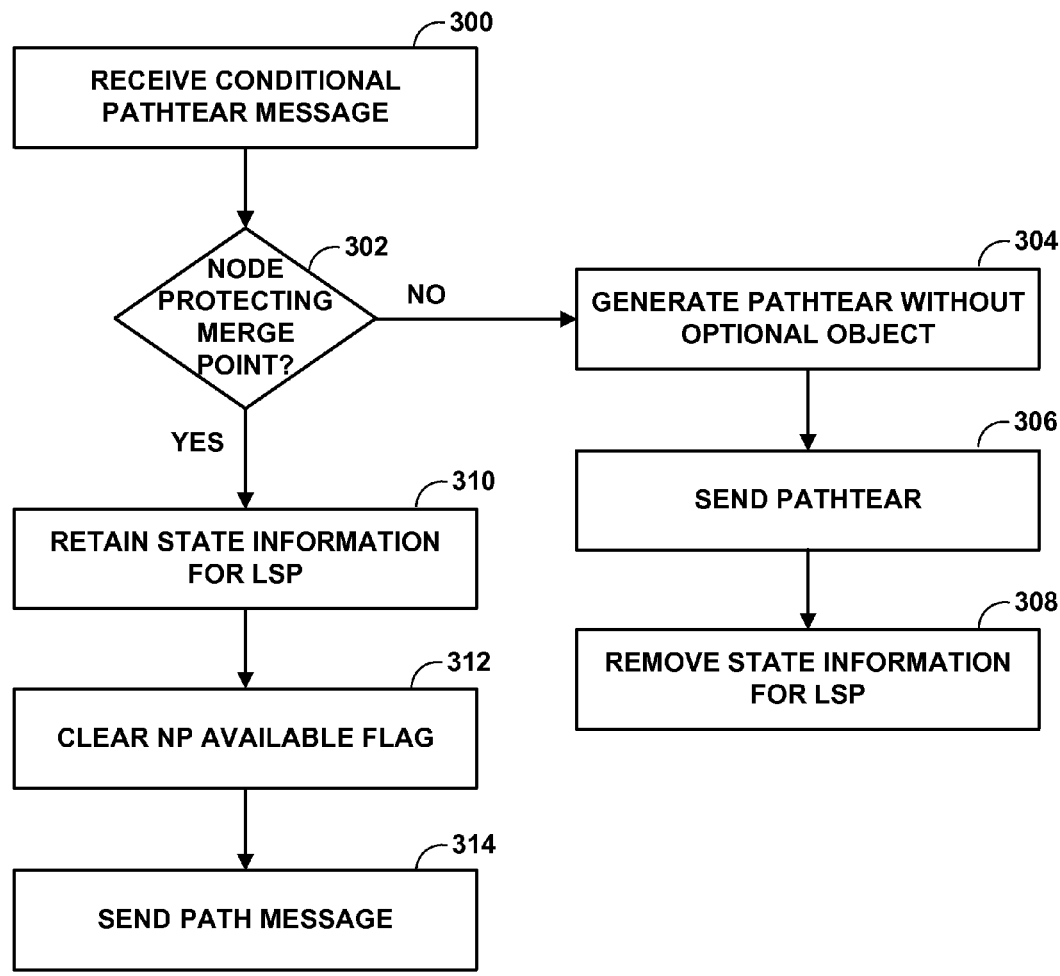

FIG. 12 is a flowchart illustrating an example operation of network devices in accordance with one or more techniques of this disclosure. For purposes of illustration, FIG. 12 will be described with reference to FIGS. 1 and 2. Router 16C is described as having the elements of router 30 shown in FIG. 2.

In one example, router 16C receives a Conditional PathTear message from router 16B (300). When router 16C receives the Conditional PathTear message from router 16B, router 16C does not immediately delete its LSP state information. Instead, MP determination module 58 of router 16C checks whether router 16B previously set "NP available" flag in the PATH message RRO flags (302). That is, router 16C determines whether it is a node protecting merge point (302). If router 16C determines that it is not a node protecting merge point ("NO" branch of 302), router 16C generates a normal PathTear message (i.e., without the optional object) (304), sends the PathTear message downstream (e.g., to router 16D) (306), and removes the LSP state information for LSP 22 (308). If router 16C determines that it is not a node protecting merge point ("YES" branch of 302), router 16C retains the LSP state information for LSP 22 (310), clears the "local protection available" and "NP available" flags in the PATH message RRO flags (312) and sends the PATH message downstream (e.g., to router 16D) (314)

Figure 13:
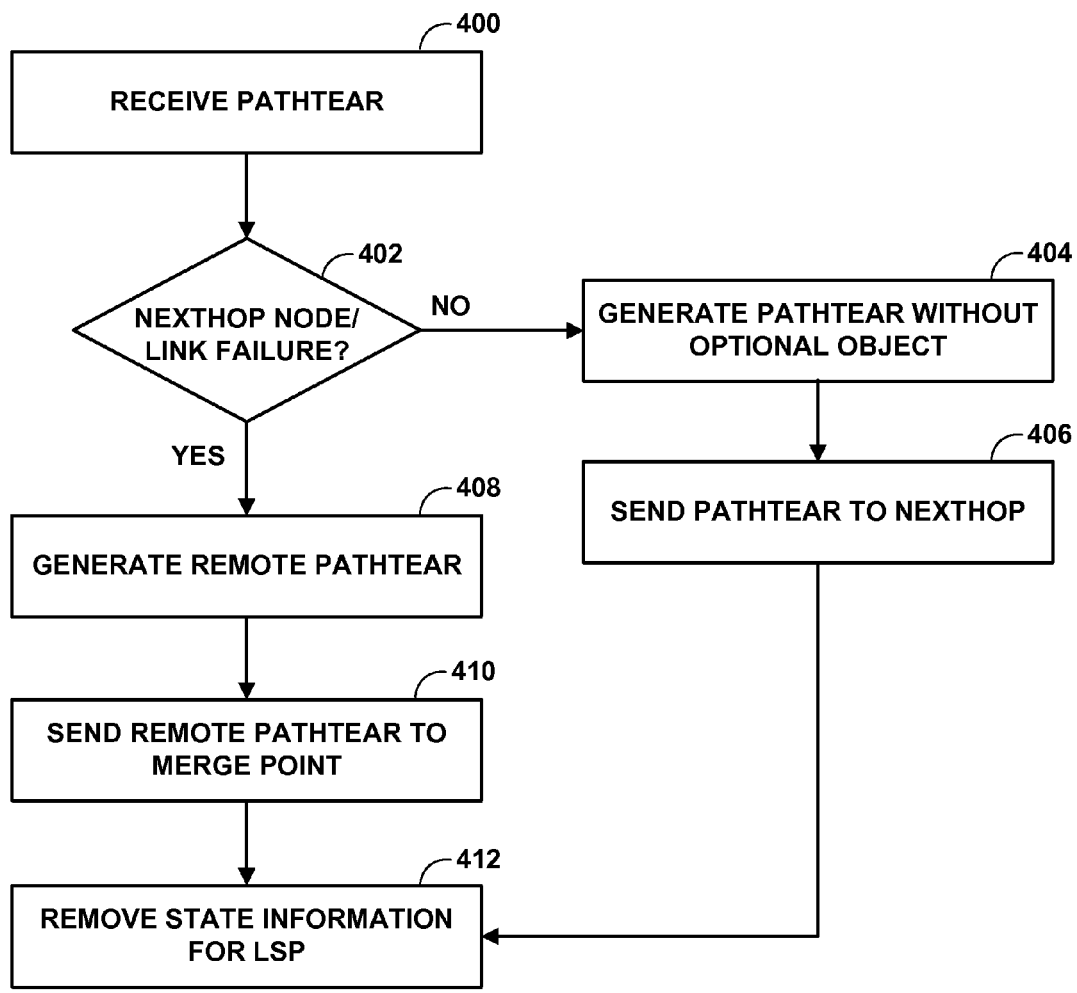

FIG. 13 is a flowchart illustrating an example operation of network devices in accordance with one or more techniques of this disclosure. For purposes of illustration, FIG. 13 will be described with reference to FIGS. 1 and 2. PE router 12A initiates takedown of LSP 22 and sends a normal PathTear message to router 16A. Router 16A receives the normal PathTear message (400). In order to facilitate state cleanup for LSP 22, router 16A determines whether the next hop node (i.e., router 16B) or the link to next hop node (i.e., link 20A) has failed (402). If router 16A determines that router 16B and link 20A have not failed (i.e., are up) ("NO" branch of 402), teardown module 60 of router 16A generates a normal PathTear message (404). The destination IP address of the normal PathTear message is the IP address of router 16B. Router 16A sends the normal PathTear message to router 16B (406). If router 16A determines that router 16B or link 20A has failed ("YES" branch of 402), teardown module 60 generates a remote PathTear message (408). The destination IP address of the remote PathTear message is the IP address of the next next hop (i.e., the merge point). In the example network topology shown in FIG. 1, the destination IP address specified in the remote PathTear is the IP address of router 16C. Router 16A sends the remote PathTear message to router 16C (410). Regardless of whether router 16A determines that the next hop node or the link to the next hop node has failed, router 16A removes the LSP state information for LSP 22 (412)

Figure 14:
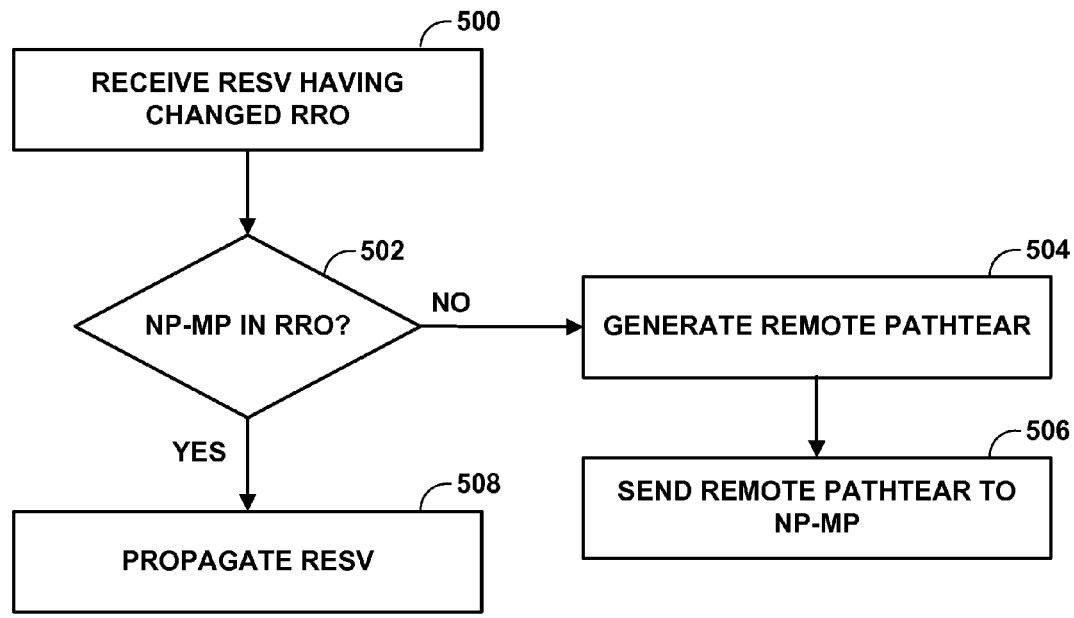

FIG. 14 is a flowchart illustrating an example operation of network devices in accordance with one or more techniques of this disclosure. For purposes of illustration, FIG. 14 will be described with reference to FIGS. 1 and 2. Router 16A receives a RESV message having changed RRO values from a downstream device along the LSP (e.g., router 16B) (500). Router 16A analyzes the RESV message to determine the changes in the RRO values. In particular, router 16A may determine whether the RESV RRO values still include information for the node protecting merge point (e.g., router 16C) (502). If router 16A processes the RESV message with the new RRO values and determines that information for the former node protecting merge point of router 16A (i.e., router 16C) is not includes ("NO" branch of 502), router 16A may send generate a Remote PathTear message (504) and send the Remote PathTear to the former node protecting merge point (i.e., router 16C) (506). If router 16A determines that information for the node protecting merge point is included in the RRO values of the RESV message ("YES" branch of 502), router 16A propagates the RESV message upstream along the LSP (e.g., to router 12A) (508).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:
1. A method comprising:
receiving, with a first network device and from a second network device, a first resource reservation path message for establishing a label switched path between the second network device and a third network device by way of the first network device such that the first network device is positioned between the second network device and the third network device along the label switched path, wherein the first resource reservation path message specifies whether local protection is desired for the label switched path;
sending, by the first network device, the first resource reservation path message to a next hop network device toward the third network device along the label switched path; and responsive to determining that the first resource reservation path message specifies that local protection is desired and responsive to receiving a resource reservation resv message from the next hop network device:
  establishing, by the first network device, a bypass label switched path between the first network device and a merge point network device along the label switched path, wherein the bypass label switched path bypasses a protected network resource positioned along the label switched path between the first network device and the merge point network device;
  generating, by the first network device, a second resource reservation path message that specifies that local protection has been established for the label switched path at the first network device; and
  sending, by the first network device and to the next hop network device along the label switched path, the second resource reservation path message.

2. The method of claim 1, wherein the first resource reservation path message further specifies whether node protection is desired, the method further comprising:
  responsive to determining that the first resource reservation path message specifies that local protection and node protection is desired:
    establishing, by the first network device, a bypass label switched path between the first network device and the merge point network device, wherein the bypass label switched path bypasses a protected network device positioned between the first network device and the merge point network device; and
    generating, by the first network device, the second resource reservation path message specifying that node protection is available; and
  responsive to determining that the first resource reservation path message specifies that local protection is desired and that node protection is not desired:
    establishing, by the first network device, a bypass label switched path between the first network device and the merge point network device, wherein the bypass label switched path bypasses a protected network link positioned between the first network device and the merge point network device; and
    generating, by the first network device, the second resource reservation path message specifying that link protection is available.

3. The method of claim 2, wherein the first resource reservation path message includes a local protection flag and a node protection flag, wherein the first resource reservation path message specifies that local protection is desired when the local protection flag is set, and wherein the first resource reservation path message specifies that node protection is desired when the node protection flag is set.

4. The method of claim 1, wherein the first resource reservation path message includes a local protection flag, and wherein the first resource reservation path message specifies that local protection is desired when the local protection flag is set.

5. The method of claim 1, wherein the second resource reservation path message that specifies local protection is available by at least including a protection availability flag that is set.

6. The method of claim 1, further comprising:
  sending, by the first network device, a remote resource reservation hello message, wherein a destination address of the remote resource reservation hello message is an address of the merge point network device, wherein the merge point network device is a next next hop of the first network device; and
  receiving, by the first network device and from the merge point network device, a remote resource reservation hello message ack message sent in response to the remote resource reservation hello message.

7. The method of claim 1, wherein the first resource reservation path message includes an enhanced facility protection flag, and wherein the resource reservation resv message is a first resource reservation resv message, the method further comprising:
  determining, by the first network device and based at least in part on the enhanced facility protection flag of the first resource reservation path message, whether the second network device supports enhanced facility protection;
  responsive to determining, by the first network device, that the second network device does not support enhanced facility protection, generating, by the first network device, a second resource reservation resv message that specifies a refresh time value that is smaller than if the second network device did support enhanced facility protection; and
  sending, from the first network device to the second network device, the resource reservation resv message.

8. The method of claim 1, wherein the resource reservation resv message is a first resource reservation resv message, the method further comprising:
  receiving, by the first network device, from the next hop device, a second resource reservation resv message that includes an enhanced facility protection flag;
  determining, by the first network device and based at least in part on the enhanced facility protection flag of the second resource reservation resv message, whether the next hop network device supports enhanced facility protection;
  responsive to determining, by a first network device, that the next hop network device does not support enhanced facility protection fast reroute, generating, by the first network device, a third resource reservation path message that specifies a refresh time value that is smaller than if the second network device did support enhanced facility protection fast reroute; and
  sending, from the first network device to the next hop network device, the third resource reservation path message.

9. The method of claim 1, wherein the resource reservation resv message is a first resource reservation resv message, the method further comprising:
  receiving, by the first network device, from the second network device, a resource reservation hello message that includes an enhanced facility protection flag;
  determining, by the first network device and based at least in part on the enhanced facility protection flag of the first resource reservation hello message, whether the second network device supports enhanced facility protection;
  responsive to determining, by a first network device, that the second network device does not support enhanced facility protection fast reroute, generating, by the first network device, a second resource reservation resv message that specifies a refresh time value that is smaller than if the second network device did support enhanced facility protection fast reroute; and
  sending, from the first network device to the second network device, the second resource reservation resv message.

10. The method of claim 1, wherein the resource reservation resv message is a first resource reservation resv message, the method further comprising:
- receiving, by the first network device, from the next hop network device, a resource reservation hello message that includes an enhanced facility protection flag;
- determining, by the first network device and based at least in part on the enhanced facility protection flag of the first resource reservation hello message, whether the second network device supports enhanced facility protection;
- responsive to determining, by a first network device, that the second network device does not support enhanced facility protection fast reroute, generating, by the first network device, a second resource reservation path message that specifies a refresh time value that is smaller than if the second network device did support enhanced facility protection fast reroute; and
- sending, from the first network device to the second network device, the second resource reservation path message.

11. The method of claim 1, wherein the first resource reservation path message specifies a refresh interval of at least one minute.

12. A first network device comprising:
one or more network interface cards; and
a control unit configured to:
- receive, from a second network device using at least one of the one or more network interface cards, a first resource reservation path message for establishing a label switched path between the second network device and a third network device by way of the first network device such that the first network device is positioned between the second network device and the third network device along the label switched path, wherein the first resource reservation path message specifies whether local protection is desired for the label switched path;
- send the first resource reservation path message to a next hop network device toward the third network device along the label switched path;
- responsive to determining that the first resource reservation path message specifies that local protection is desired and responsive to receiving a resource reservation resv message from the next hop network device:
  - establish a bypass label switched path between the first network device and a merge point network device along the label switched path, wherein the bypass label switched path bypasses a protected network resource positioned along the label switched path between the first network device and the merge point network device;
  - generate a second resource reservation path message that specifies that local protection has been established for the label switched path at the first network device; and
  - send, to the next hop network device along the label switched path using at least one of the one or more network interface cards, the second resource reservation path message.

13. The first network device of claim 12,
wherein the first resource reservation path message further specifies whether node protection is desired, and
wherein the control unit is further configured to:
- responsive to determining that the first resource reservation path message specifies that local protection and node protection is desired:
  - establish a bypass label switched path between the first network device and the merge point network device, wherein the bypass label switched path bypasses a protected network device positioned between the first network device and the merge point network device; and
  - generate the second resource reservation path message specifying that node protection is available; and
- responsive to determining that the first resource reservation path message specifies that local protection is desired and that node protection is not desired:
  - establish a bypass label switched path between the first network device and the merge point network device, wherein the bypass label switched path bypasses a protected network link positioned between the first network device and the merge point network device; and
  - generate the second resource reservation path message specifying that link protection is available.

14. The first network device of claim 13, wherein the first resource reservation path message includes a local protection flag and a node protection flag, wherein the first resource reservation path message specifies that local protection is desired when the local protection flag is set, and wherein the first resource reservation path message specifies that node protection is desired when the node protection flag is set.

15. The first network device of claim 12, wherein the first resource reservation path message includes a local protection flag, and wherein the first resource reservation path message specifies that local protection is desired when the local protection flag is set.

16. The first network device of claim 12, wherein the second resource reservation path message that specifies local protection is available by at least including a protection availability flag that is set.

17. The first network device of claim 12, wherein the control unit is configured to send, using at least one of the one or more network interface cards, a remote resource reservation hello message, wherein a destination address of the remote resource reservation hello message is an address of the merge point network device, wherein the merge point network device is a next next hop of the first network device, and receive, from the merge point network device, a remote resource reservation hello message ack message sent in response to the remote resource reservation hello message.

18. The first network device of claim 12,
wherein the first resource reservation path message includes an enhanced facility protection flag,
wherein the resource reservation resv message is a first resource reservation resv message, and
wherein the control unit is configured to:
- determine, based at least in part on the enhanced facility protection flag of the first resource reservation path message, whether the second network device supports enhanced facility protection;
- responsive to determining that the second network device does not support enhanced facility protection, generate a second resource reservation resv message that specifies a refresh time value that is smaller than if the second network device did support enhanced facility protection; and send, to the second network device and using at least one of the one or more network interface cards, the second resource reservation resv message.

19. The first network device of claim 12,
wherein the resource reservation resv message is a first resource reservation resv message, and
wherein the control unit is configured to:
   receive, from the next hop device and using at least one of the one or more network interface cards, a resource reservation resv message that includes an enhanced facility protection flag;
   determine, based at least in part on the enhanced facility protection flag of the first resource reservation resv message, whether the next hop network device supports enhanced facility protection;
   responsive to determining that the next hop network device does not support enhanced facility protection fast reroute, generate a second resource reservation path message that specifies a refresh time value that is smaller than if the second network device did support enhanced facility protection fast reroute; and
   send, to the next hop network device and using at least one of the one or more network interface cards, the second resource reservation path message.

20. The first network device of claim 12,
wherein the resource reservation resv message is a first resource reservation resv message, and
wherein the control unit is configured to:
   receive, from the second network device and using at least one of the one or more network interface cards, a resource reservation hello message that includes an enhanced facility protection flag;
   determine, based at least in part on the enhanced facility protection flag of the first resource reservation hello message, whether the second network device supports enhanced facility protection;
   responsive to determining, by a first network device, that the second network device does not support enhanced facility protection fast reroute, generate a second resource reservation resv message that specifies a refresh time value that is smaller than if the second network device did support enhanced facility protection fast reroute; and
   send, to the second network device and using at least one of the one or more network interface cards, the second resource reservation resv message.

21. The first network device of claim 12,
wherein the resource reservation resv message is a first resource reservation resv message, and
wherein the control unit is configured to:
   receive, from the next hop network device and using at least one of the one or more network interface cards, a resource reservation hello message that includes an enhanced facility protection flag;
   determine, based at least in part on the enhanced facility protection flag of the first resource reservation hello message, whether the second network device supports enhanced facility protection;
   responsive to determining that the second network device does not support enhanced facility protection fast reroute, generate second a resource reservation path message that specifies a refresh time value that is smaller than if the second network device did support enhanced facility protection fast reroute; and
   send, to the second network device and using at least one of the one or more network interface cards, the second resource reservation path message.

22. The first network device of claim 12, wherein the first resource reservation path message specifies a refresh interval of at least one minute.

23. A non-transitory computer-readable storage medium encoded with instructions for causing one or more processors of a first network device to:
   receive, from a second network device, a first resource reservation path message for establishing a label switched path between the second network device and a third network device by way of the first network device such that the first network device is positioned between the second network device and the third network device along the label switched path, wherein the first resource reservation path message specifies whether local protection is desired for the label switched path;
   send the first resource reservation path message to a next hop network device toward the third network device along the label switched path and responsive to receiving a resource reservation resv message from the next hop network device; and
   responsive to determining that the first resource reservation path message specifies that local protection is desired and responsive to receiving a resource reservation resv message from the next hop network device:
     establish a bypass label switched path between the first network device and a merge point network device along the label switched path, wherein the bypass label switched path bypasses a protected network resource positioned along the label switched path between the first network device and the merge point network device;
     generate a second resource reservation path message that specifies that local protection has been established for the label switched path at the first network device; and
     send, to the next hop network device along the label switched path, the second resource reservation path message.

* * * * *